United States Patent
Testani et al.

[11] Patent Number: 6,141,357
[45] Date of Patent: Oct. 31, 2000

[54] METHOD AND APPARATUS FOR CONTROLLING MOBILE RECEIVERS

[76] Inventors: Alan John Testani, 2851 Banyan Blvd. Cir., Boca Raton, Fla. 33431-6363; Eugene Arnold Eighmy, 5361 Riverbend Trail, Hoover, Ala. 35244; William Thomas Edwards, 1630 Keeneland Dr., Helena, Ala. 35080

[21] Appl. No.: 09/167,962
[22] Filed: Oct. 6, 1998

Related U.S. Application Data

[63] Continuation of application No. 08/738,227, Oct. 25, 1996, Pat. No. 5,818,814.
[51] Int. Cl.[7] .................................................. H04J 3/06
[52] U.S. Cl. ......................... 370/507; 359/158; 455/502
[58] Field of Search .................................. 370/350, 503, 370/507; 375/354, 356, 358, 368, 364; 359/154, 155, 157, 158, 159; 455/500, 502, 503

[56] References Cited

U.S. PATENT DOCUMENTS

| | | |
|---|---|---|
| 4,327,441 | 4/1982 | Bradshaw . |
| 4,457,019 | 6/1984 | Szabo, Jr. et al. . |
| 4,991,126 | 2/1991 | Reiter ........................................ 702/150 |
| 5,392,331 | 2/1995 | Patsiokas et al. . |
| 5,490,167 | 2/1996 | Sumi et al. ............................... 375/219 |
| 5,517,675 | 5/1996 | O'Connor et al. . |
| 5,615,228 | 3/1997 | Soenen . |
| 5,818,814 | 10/1998 | Testani et al. ........................... 370/212 |
| 5,852,506 | 12/1998 | Testani et al. ........................... 359/155 |
| 5,889,473 | 3/1999 | Wicks ................................. 340/825.44 |

Primary Examiner—Ricky Ngo
Attorney, Agent, or Firm—Howison, Chauza, Handley & Arnott; Gregory M. Howison; Stephen S. Mosher

[57] ABSTRACT

A user headset is provided that is operable to contain an audio device (50) and a receiver (52). The receiver (52) is operable to receive both audio information on multiple channels and also data. The data is received in the form of pulse width modulated sync signals. The sync signals are operable to provide a synchronization signal for 3-D liquid crystal lenses (60). The data is encoded within the sync signal through pulse width modulation. The width of the pulse defines various commands. These various commands define the channel over which the audio is to be transmitted. These channels can either be user-defined or they can be a function of the transmitter. The transmitter includes an audio generator (42) for generating audio signals on multiple channels and also a data generator (40). These are modulated onto a broad band optical signal and transmitted via an IR data link. The system facilitates a walking tour by transmitting commands to the receiver that allow the receiver to lock onto a particular channel, there being select channels for a given zone. When walking from one zone to another zone, different channels in the next zone are automatically detected. The system detects the crossing of a boundary between zones by a change in sync frequency. Since the sync signals for both zones are synchronized, this facilitates a seamless transfer between adjacent zones. The synchronization is provided by transmitting a pulse stream at different frequencies with the command information encoded within the pulses by pulse-width modulation. The frequencies are harmonics of a fundamental frequency, such that the higher frequency merely adds a pulse to the pulse stream. By selecting the smallest pulse width, the highest priority transmitter can have information extracted therefrom.

34 Claims, 13 Drawing Sheets

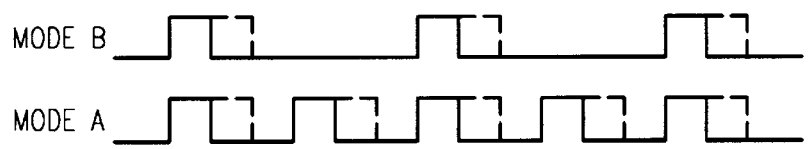
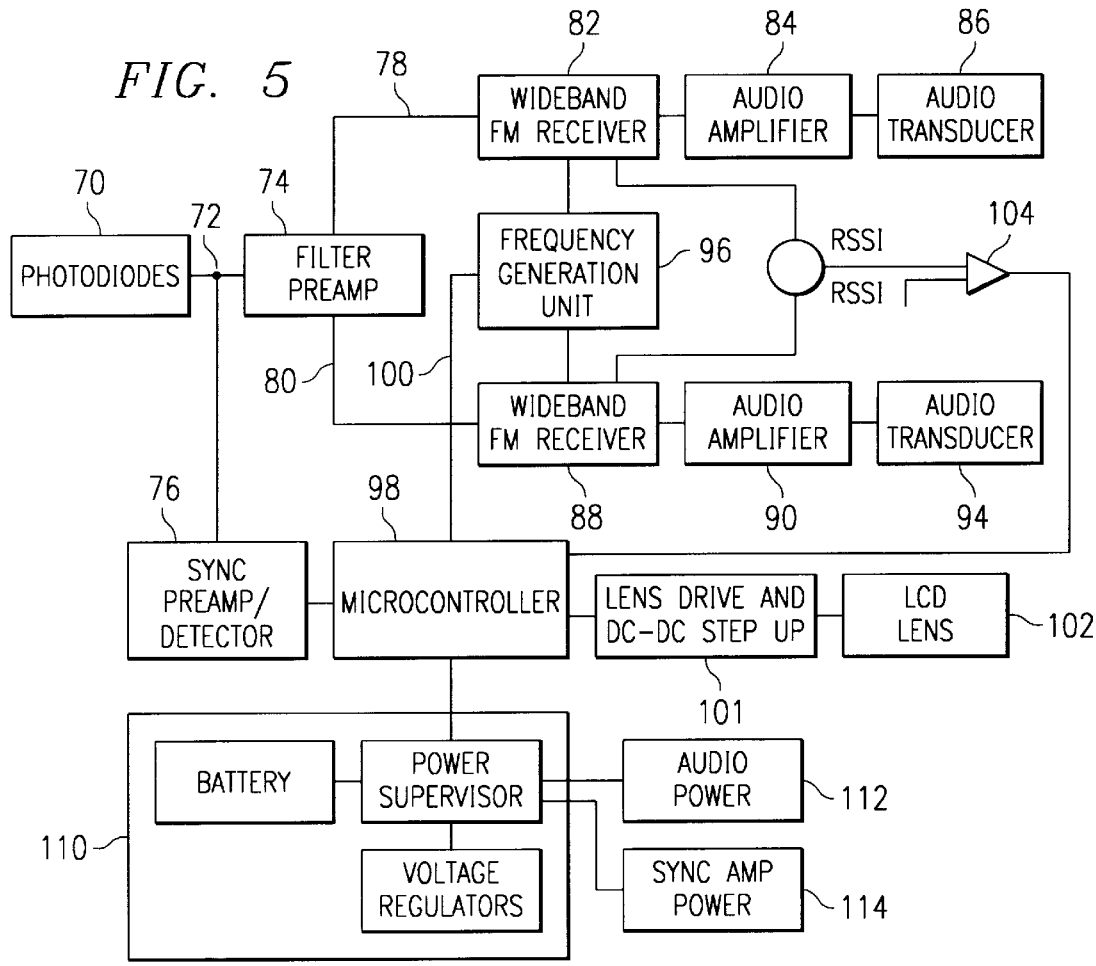
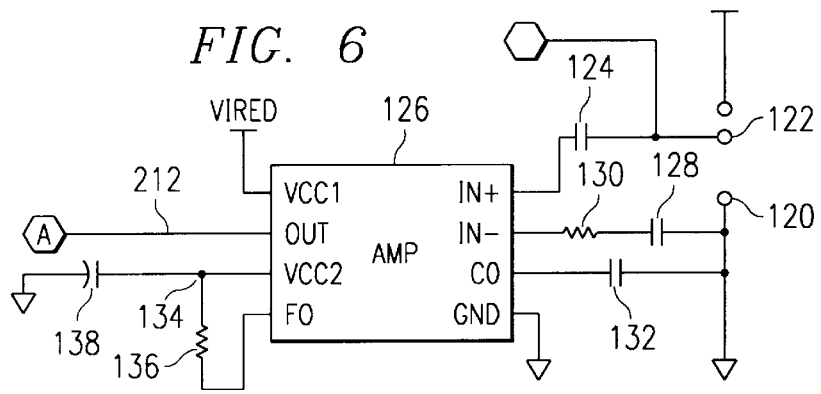

METHOD AND APPARATUS FOR CONTROLLING MOBILE RECEIVERS

This application is a Continuation of U.S. patent application Ser. No. 08/738,227, filed Oct. 25, 1996 and entitled "Method and Apparatus for Synchronizing and Controlling a Remote Receiver" now U.S. Pat. No. 5,818,814 which is related to U.S. patent application Ser. No. 08/736,897, filed Oct. 25, 1996, and entitled "Method and Apparatus for Providing Zoned Communication," now U.S. Pat. No. 5,850,610 and U.S. patent application Ser. No. 08/738,220, filed Oct. 25, 1996, and entitled "Method and Apparatus for Controlling Program Start/Stop Operations," now U.S. Pat. No. 5,852,506. This application is related to co-pending U.S. patent application Ser. No. 08/736,897, filed Oct. 25, 1996, entitled "Method and Apparatus for Providing Zoned Communication," and to co-pending U.S. patent application Ser. No. 08/738,220, field Oct. 25, 1996, entitled "Method and Apparatus for Controlling Program Start/Stop Operations," both applications filed on even date herewith.

TECHNICAL FIELD OF THE INVENTION

The present invention pertains in general to communication systems and, more particularly, to a communication system for allowing a remote receiver to traverse various zones with different information transmitted in each zone, with the receiver switching to the transmitter in the resident zone.

BACKGROUND OF THE INVENTION

In trade shows, museums, theme parks, video games, and many other attractions, multiple displays are typically utilized for multiple exhibits or even for a single exhibit. This is also the case with some single entity shows, wherein multiple exhibits are contained in one hall and a viewer is allowed to roam from exhibit to exhibit.

With some trade shows and with some exhibits, a user is provided a tape recorder. These type of situations are referred to as "walking tours". In a walking tour, the user is provided with the tape recorder and is instructed to turn the tape recorder on and go to the defined exhibit number. At the end of the description of that exhibit, the user is instructed to turn off the tape recorder until they go to the next exhibit. At the next exhibit, the tape recorder is again turned on and the narrative continued.

In another type of system, some type of receiver could be utilized with separate transmitters disposed at each location. When a user comes within a particular transmit range of a given transmitter, the information is received. One disadvantage to this type of system is that with respect to "overlap", wherein two transmitters of the same frequency are transmitting in overlapping areas. If this occurs, there is a strong possibility that there will be some interference or incorrect signal reception. If more than one audio or data channel is provided with any receiver, this typically will require two or more separate RF channels. Further, there must be some method provided by which channels can be changed when going into a particular zone.

SUMMARY OF THE INVENTION

The present invention disclosed and claimed herein comprises a method for synchronizing a mobile receiver to one of a plurality of transmitters, each transmitter disposed in a separate zone and having a defined range. A common command channel is provided for both zones over which command information can be transmitted from the transmitters. Each of the transmitters is operable to transmit over the common command channel a carrier having a pulse stream at a frequency that is a harmonic of a predetermined fundamental frequency. The pulse streams are synchronized with each other with at least two transmitters having different frequencies. Each of the pulses in each of the pulse streams is pulse width modulated with command information associated with the associated transmitter. The receiver then extracts the pulse stream that was transmitted over the command channel and received thereby such that, if a pulse stream received by the mobile receiver command channel is a result of two received transmissions from two different transmitters, the pulse edges of the two simultaneously received transmissions will be aligned. Thereafter, the receive command information is decoded by decoding the information in the pulse width of the highest frequency pulse stream in the event that more than one transmission is received. Thereafter, the command is executed.

BRIEF DESCRIPTION OF THE DRAWINGS

For a more complete understanding of the present invention and the advantages thereof, reference is now made to the following description taken in conjunction with the accompanying Drawings in which:

FIG. 4 illustrates a block diagram of the timing diagram illustrating the synchronization and pulse with modulation technique;

FIG. 5 illustrates a block diagram of the headset;

FIG. 6 illustrates a schematic diagram of the sync detector;

DETAILED DESCRIPTION OF THE INVENTION

Figure 1:
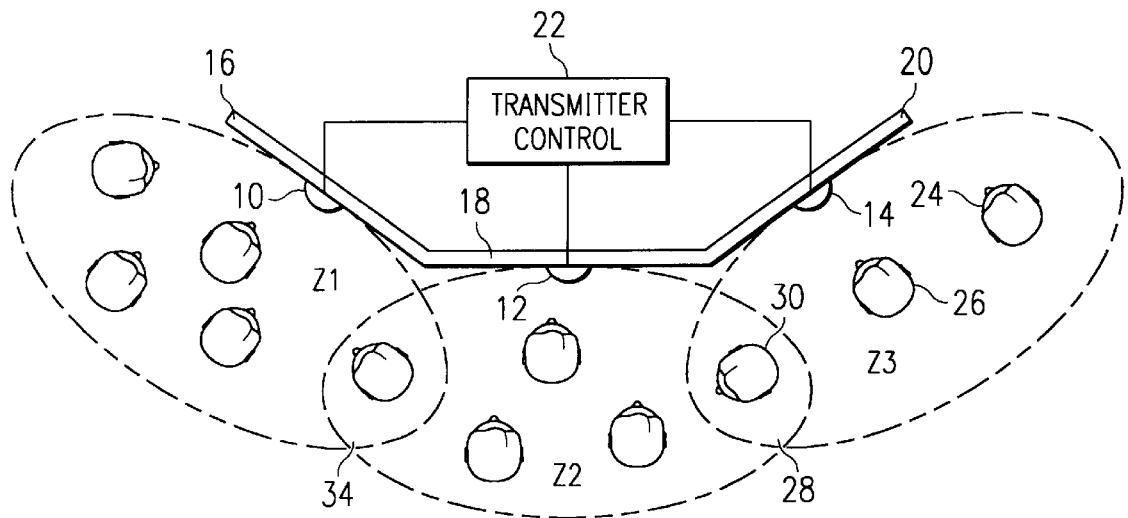
FIG. 1 illustrates a top view of a multiple zone system with three transmitters.

Referring now to FIG. 1, there is illustrated a top view of a multi-zone system operating in accordance with the present invention. There are illustrated three transmitters 10, 12 and 14, disposed on three separate walls 16, 18 and 20, respectively. These walls are illustrated as being associated with three separate zones, Zone 1, Zone 2 and Zone 3 labeled Z1, Z2 and Z3. The Zones Z1, Z2 and Z3 are illustrated in phantom line. The transmitters 10–14 are all associated with a transmitter control 22, which transmitter control can be centralized or it can be distributed. However, there is always a common synchronization with respect to all three transmitters 10–14, as will be described in more detail hereinbelow. In each of the Zones Z1–Z3, there are disposed multiple listeners. For example, in Zone Z3 there are two listeners 24 and 26, which are exclusively within Zone 3 and not within Zone Z1 or Zone Z2. Zone Z2 overlaps with Zone Z3 in an area 28. In this area, there is a listener 30 traversing from Zone Z3 to Zone Z2. As such, the listener 30 receives signals from both transmitter 12 and transmitter 14. With the present invention, the listener 30 will automatically receive information from the highest priority one of the transmitters 12 or 14. Additionally, as will be described hereinbelow, this is a seamless transition. In a walking tour scenario, a listener could traverse from an area outside of any of the Zones Z1–Z3 and into Zone Z3. Outside of Zone Z3, the listener would not receive anything on a headset that the listener is wearing. As soon as the listener entered Zone Z3, it would synchronize to transmitter 14 and receive information and commands from the transmitter 14. When the user traversed from Zone Z3 to Z2, as soon as it entered the overlap region 28, Zone Z2 would take over, Zone Z2 being higher priority than Zone Z3. The listener would then receive information and commands from transmitter 12. Upon traversing from Zone Z2 to Zone Z1, the listener would traverse an overlap region 34. In this overlap region 34, the listener would receive information from the higher priority one of Zone Z1 and Zone Z2. In the preferred embodiment, as will be described hereinbelow, Zone Z2 is higher priority than Zone Z1 and Zone Z3. Therefore, the listener would have to traverse outside of the overlap region 34 and into the exclusive portion of Zone Z1 in order to receive commands and information from transmitter 10.

Figure 2:
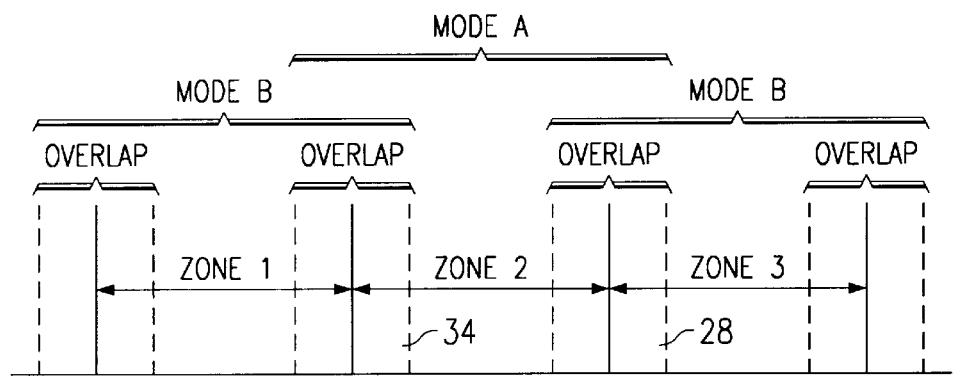
FIG. 2 illustrates a diagrammatic view of the multi-zone system of FIG. 1.

Referring now to FIG. 2, there is illustrated a diagrammatic view of the zone operation. This diagrammatic view is taken from the perspective of a cross section through all of the zones and the method by which they adjoin each other. As will be described hereinbelow, there are two modes that the transmitters can operate in, these defined by a sync frequency. The receivers in the headsets worn by the listeners are able to discern a change in command frequency from a low frequency to a high frequency. The high frequency is given the highest priority. In the example illustrated in FIG. 2, Mode A is the highest frequency and Mode B is the lowest frequency. When the user goes from the low frequency to the high frequency, the receiver will automatically receive commands from the higher frequency transmitter or from Mode A. When the user traverses from Zone Z2 to Zone Z1, there will be a portion of the time that the listener will be in the overlap area 34. During this time, however, the transmitter 12 in Zone Z2 will have priority. It is only when the listener passes outside of the overlap area 34 into Zone Z1, that the transmitter 10 in Zone Z1 will take over and the listener will then receive command information therefrom. The audio information is transmitted on separate channels, such that adjacent zones do not have common channels. As will be further discussed hereinbelow, the synchronizing information will be received in the form of pulses. These pulses have a pulse width. By incrementally varying the pulse width, commands can be sent. Again, this will be described in more detail hereinbelow. These commands allow the system to configure the operation of the receiver, as will be described in more detail hereinbelow.

Figure 3:
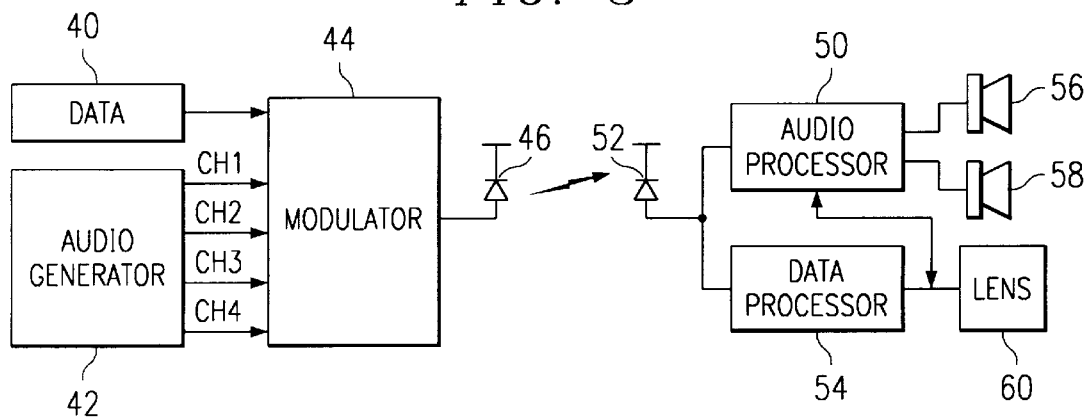
FIG. 3 illustrates a block diagram of the receiver/transmitter.

Referring now to FIG. 3, there is illustrated a block diagram of the receiver in the headset and the transmitters. The transmitter is generally comprised of a data block 40 for generating synchronizing and command information and an audio generator 42 for generating audio on multiple channels, four channels in the preferred embodiment. This information is all sent to the modulator 44 for modulating the information in the form of audio and data onto separate carrier frequencies, there being two carrier frequencies associated with each stereo audio channel and the command/synch information. This is then utilized to modulate an optical diode 46. As will also be discussed hereinbelow, the audio channels are binaural, such that each channel requires two signals. Therefore, there are in effect eight audio channels.

The receiver is comprised of an audio processing section 50 for receiving from an optical receiver 52 the audio information on all of the transmitted channels. The audio processing section 50 is controlled by a data processing section 54 to only select the appropriate channel and, since it is binaural, it will actually receive both portions of a given channel, i.e., two audio channels. These are then utilized to drive two loudspeakers 56 and 58. The data processing section 54 is also operable to receive the synchronization and command information from the modulated carrier that is received and decoded from the command carrier by the optical receiver 52 for processing thereof In one mode, a video mode, Liquid Crystal Display (LCD) shutters are operated in a three-dimensional programming mode, this referred to by block 60, labeled "LENS". The headset generally is described in U.S. Pat. No. 5,272,757, U.S. Pat. No. D358,151 and U.S. Pat. No. D358,158, each of which is incorporated herein by reference. These headsets are operable to integrate a three-dimensional sound system with a three-dimensional LCD LENS system.

Referring now to FIG. 4, there is illustrated a timing diagram depicting a Mode A and a Mode B. Mode A is illustrated as a stream of pulses, which is a frequency of 24 Hz in the present invention. Mode B is illustrated as being a stream of pulses at frequency of 12 Hz. It can be seen that the pulses have the rising edge thereof synchronized. Each of the pulses in Mode A and Mode B can have the pulse width thereof varied. Of course, the pulse width remains constant for a predetermined number of pulses, such that this information can be transmitted. The information contained in this pulse width is the command information. As will be described hereinbelow, this determines whether a particular channel is selected, whether a mute operation is selected, etc.

It can be seen from the timing diagram of FIG. 4 that, if a receiver is receiving command information from a Mode B transmitter, and then begins receiving from a Mode A transmitter, it can detect the switch, since it detects the additional pulse. However, if a receiver were receiving from a Mode A transmitter and then receives at the same time command information from a Mode B transmitter, it would not recognize the additional pulse.

When traversing from a Mode B to a Mode A transmitter, the additional pulse would be recognized. However, if the pulse width of the Mode B transmitter were larger than the pulse width of the Mode A transmitter, this would result in half of the pulses having a different pulse width. The software utilized to determine the pulse width is essentially a software counter. This counter is reset at the rising edge of the pulse and its value read at the falling edge of the pulse. A register or buffer is provided for storing this information for each pulse. This system will not declare a valid received signal until it receives approximately ten or more sequential pulses having the same pulse width. At that time, it will declare that it has received a pulse width of that length. Alternatively, however, this system could recognize that it has received a higher frequency signal and discriminate the new pulse width, if the new pulse width is shorter. Of course, for a longer pulse width in the Mode A transmitter, the falling edge of the pulse aligned with the Mode B transmitter will be additive and it will effectively have the same pulse width as the added pulses. It is only for the shorter pulse width in the Mode A transmitter that there can be a problem. The system can merely wait for the listener to move out of the overlap region or make a decision based upon half of the pulses, i.e., if half have a shorter pulse width, this means that the shorter pulse width must be due to the higher priority transmitter. If more than ten of the shorter pulses are received, this could be used to make the decision that the listener is now in the higher priority zone. In any event, it can be seen that this is a seamless operation and merely requires a single command channel wherein the command information is received from both systems, the Mode A transmitter and the Mode B transmitter, at the same time, but the Mode A transmitter takes priority. By determining that a change has been made from a Mode B transmitter to a Mode A transmitter, a shorter pulse width on the Mode A transmitter will be selected as the prevailing command; that is, the system can arbitrate the reception of two pulse widths and select the shorter pulse width, which by design must be due to the Mode A transmitter. It is noted that the command channel can have a much greater range than the program channels, such that the receiver can have the channel selected prior to the receiver entering the program receive zone of the transmitter by receiving the command from the command channel well prior to receiving the program channels.

Referring now to FIG. 5, there is illustrated an overall block diagram of the receiver. A photo diode block 70 is provided, which contains conventionally available photo diodes, which are mounted on the headset. These are relatively broad band and operated over a frequency range of 360 kHz to 3,000 kHz. This provides an output on a node 72. The node 72 is input to a filter preamp circuit 74 and also to a sync preamp/detector circuit 76. The filter/preamp circuit 74 operates over a frequency range of 360 kHz to 3,000 kHz, whereas the sync preamp/detector circuit 76 operates at a frequency of 2.4 MHZ and/or 76 kHz. This is relatively narrow operating range.

The filter preamp circuit 74 provides two channels, one on a line 78 and one on a line 80. The channel on line 78 is input to a wide band FM receiver 82, which is then fed to an audio amplifier 84 and then to an audio transducer 86, which audio transducer 86 is essentially one of the speakers 56 and 58. Similarly, node 80 is fed to a wide band FM receiver 88, the output of which is passed through an audio amplifier 90 to drive an audio transducer 94. The audio transducers are of the type manufactured by Tandy Corporation, Model No. 331021. The wide band FM receivers 82 and 88 are of the type NE605, manufactured by Philips. These are relatively straight forward and conventionally available devices.

Each of the FM receivers 88 is controlled by various crystals 96. The crystals 96 are selectable to determine the frequency range or the channel to which the FM receivers 82 and 88 are tuned. As described above, there are four major channels for audio reception, each channel having two sub-channels. Therefore, there are a total of eight channels of audio information (although any number of channels could be accommodated). The FM receivers 82 and 88 are tuned to two separate channels to receive the information for the two different audio transducers 86 and 94. Also as described above, this information is for binaural reception.

The sync preamp/detector 76 is operable to detect and amplify the sync signal, described above with reference to FIG. 4, and this then input to a micro-processor or micro-controller unit (MC) 98. This is a conventionally available micro-controller of the type MC68HC705J2, manufactured by Motorola, utilized in one embodiment. This generally provides control signals on a line 100 to drive the crystal selection circuit 96 and also provide signals to a lens driving circuit 101 to drive an LCD lens 102. Various built-in test operations are provided by receiving the signal strength indicator outputs of the signal strength indicator outputs of the receivers 82 and 88 and compare them in a comparator 104 with a reference voltage and then output the signal to the MC 98. Various power supply operations are provided by a power-up circuit 110 which provides power to an audio power supply 112 and a synchronizing amp power supply 114. These are utilized for power conservation aspects of the receiver.

Referring now to FIG. 6, there is illustrated a schematic diagram of the sync preamp/detector 76. The input from the photo diode 70 is received on a photo diode input, configured of a negative terminal 120 and a positive terminal 122, negative terminal 120 connected to ground. The positive terminal is connected to one side of a capacitor 124, the other side thereof connected to the positive input of an integrated circuit 126. Integrated circuit 126 is a conventional amplifier which is manufactured by NEC, Model No. UPC2800A. The negative input 120 is also connected to one side of a capacitor 128, the other side thereof connected to one side of a resistor 130, the other side of resistor 130 connected to a negative input of the IC 126. The CO port of IC 126 is connected to one side of a capacitor 132, the other side thereof connected to ground. The input $V_{CC1}$ is connected to the power supply VIRED, the photo diode voltage. The input $V_{CC2}$ connected to a node 134, node 134 connected to a resistor 136 to the FO input. Node 134 is also connected to one side of a capacitor 138, the other side thereof connected to ground. The sync output is provided on a node 212 labeled "A". The circuitry of FIG. 6 effectively provides a relatively sensitive input stage with a pulse output.

Referring now to FIG. 7*a* through FIG. 7*f*, there are illustrated detailed schematic diagrams of the sync pulse receiver. With specific reference to FIG. 7*a*, there is illustrated one embodiment of the MCU 98 utilizing a micro-controller 220, of the type MC68HC705J2, manufactured by Motorola and referred to with the reference "MCU". A crystal 222 is disposed across the oscillator input to the MCU 220 with a reset signal received on a line 224. A capacitor 226 is disposed between the reset input and ground with a resistor 228 disposed between the reset input and the power supply $V_{up}$. Four of the outputs, represented by fines 230, are provided to drive four LEDs, LED1, LED2, LED3 and LED4. However, the preferred embodiment requires less than four LEDs, as will be described hereinbelow, and it should be understood that any number of LEDs could be utilized for the purpose of providing some type of display for the user. Further, any type of display device could be utilized, including a sound output.

The interrupt input "IRQ" is connected to the drain of an N-channel transistor 234, the source thereof connected to ground and the gate thereof connected to the output of the sync amplifier/detector of FIG. 6 on line 212. The IRQ input is also connected to the power supply through a pull-up resistor 236. Four lines are provided as outputs and represent the control signal line 100 that is connected to the frequency generation unit 96 of FIG. 5. These provide the selection of four separate frequencies or, as will be described hereinbelow, four separate crystal pairs. Three separate lines 238 are provided that are operable to drive the LCD lens 102, these input to the lens driver 101. Another output on a line 240 is provided for driving an inverter 242 to provide an output $V_{AUD}$ which is output to the audio receiver, this being a control signal. A low signal on the output thereof causes the voltage $V_{AUD}$ to go high.

A switch input on a node 225 is received from the audio board which is connected through an RC network comprised of a resistor 227 and a capacitor 229 to an input of the MCU 220. A pull-up resistor 231 is connected between node 225 and the power supply signal $V_{up}$. This provides a switch input from the audio board, as will be described hereinbelow.

Figure 7A:
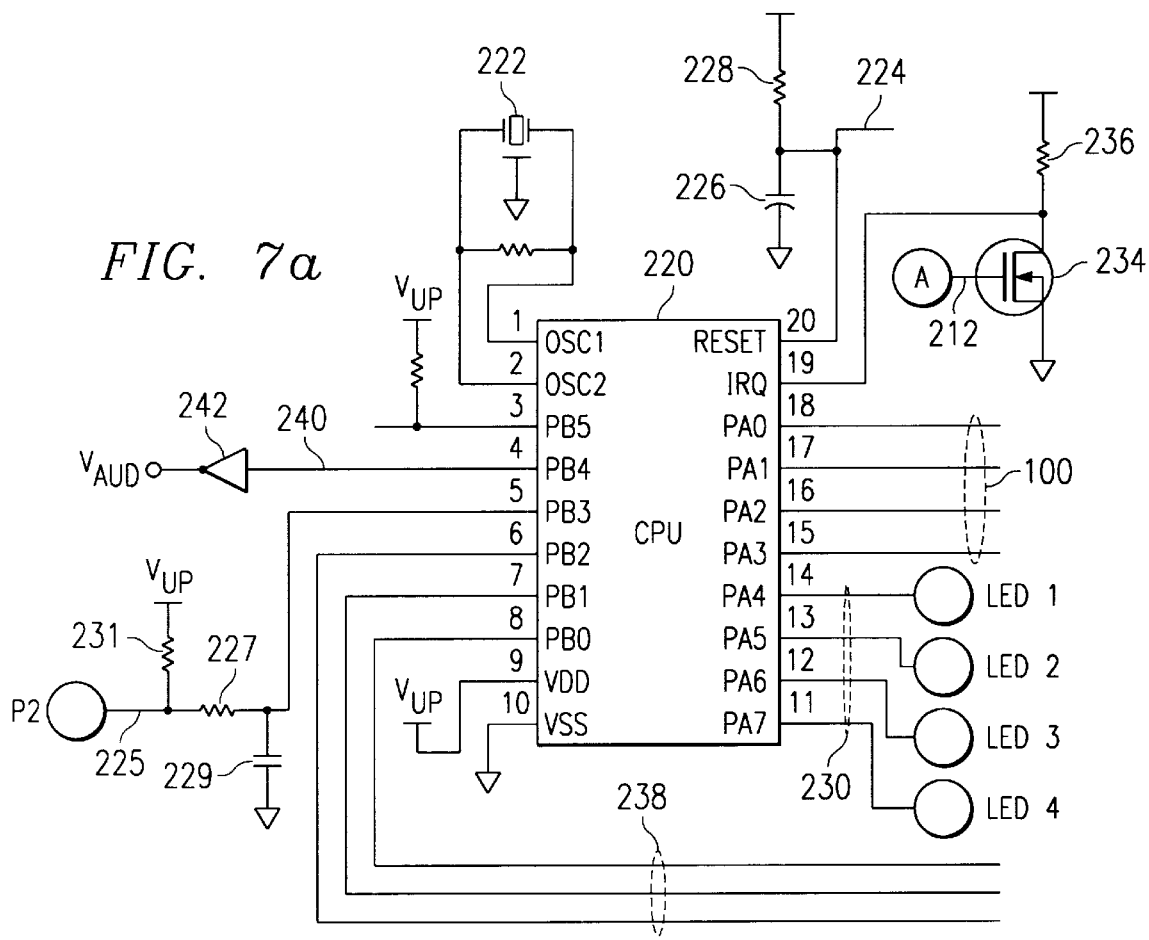
FIGS. 7a–7f illustrate a logic diagram of the sync pulse receiver.
Figure 7B:
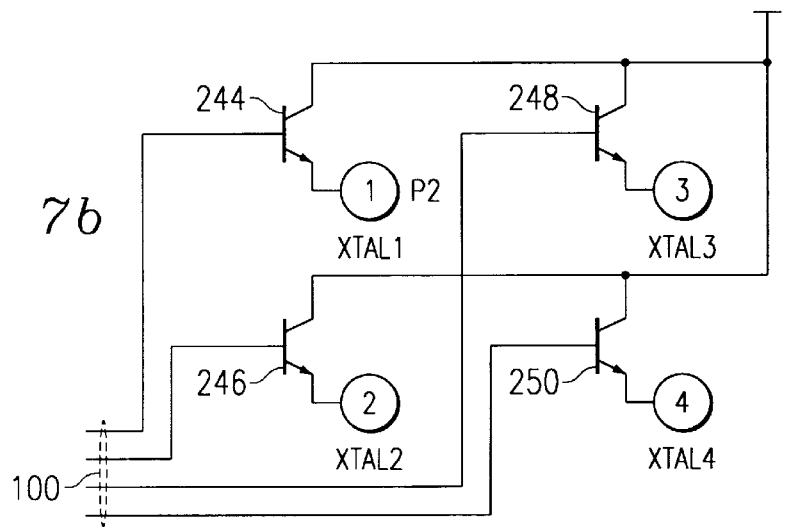

Referring now to FIG. 7b, there is illustrated a schematic diagram of the driving circuit for driving the frequency generation unit 96. The driving unit is comprised of four bipolar NPN transistors 244, 246, 248 and 250 having the collectors thereof connected to the positive supply and the emitters thereof for providing driving signals XTAL1, XTAL2, XTAL3 and XTAL4 to the frequency generation unit 96, these being basically emitter follower transistors, as will be described hereinbelow.

Figure 7C:
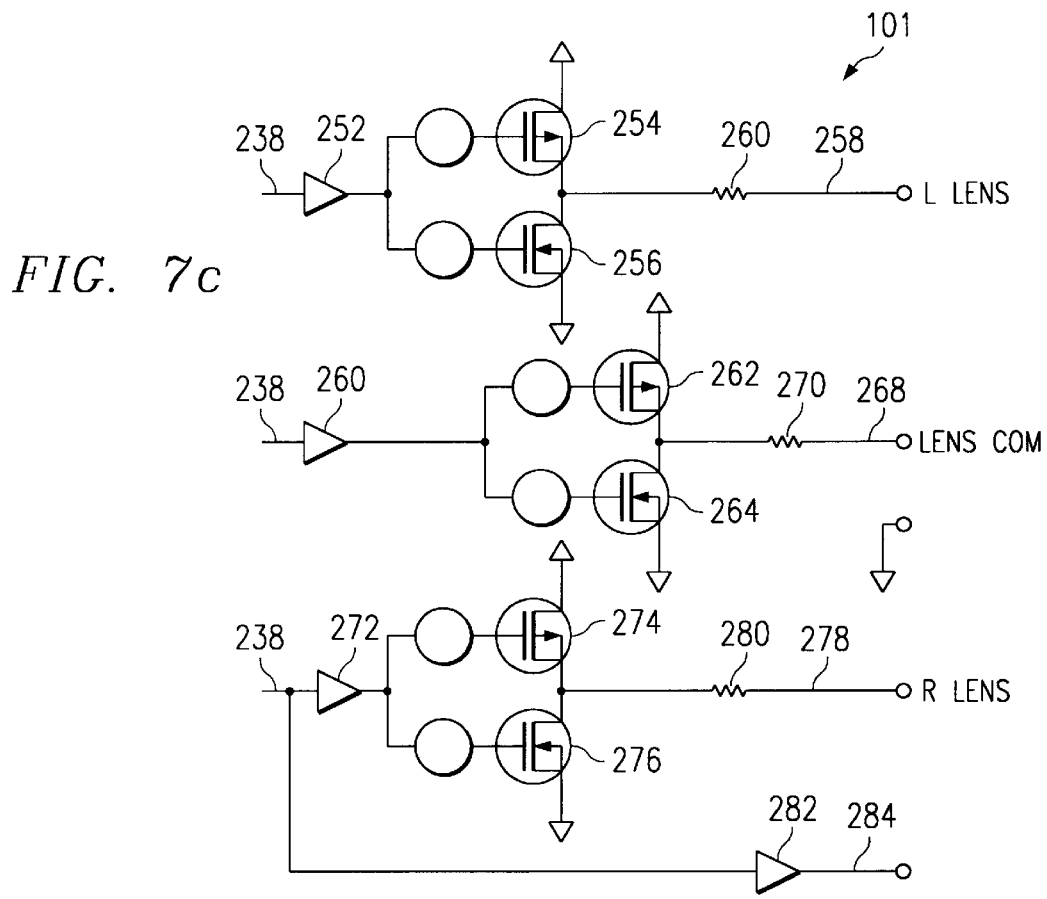

Referring now to FIG. 7c, there is illustrated a schematic diagram of the lens driver 101. Each of the three lines 238 provide the drive for the left lens, the common terminal for the lens and the right lens, respectively. The left lens one of the lines 238 is input through a driver 252 to drive the gates of a complimentary coupled P-channel transistor 254 and N-channel transistor 256, the output thereof driving an output line 258 from a stepped up voltage $V_{LCD}$ through a resistor 260. Similarly, the one of the lines 238 associated with the common terminal of the lens is passed through a driver 260 to the gates of two complimentary coupled transistors, a P-channel transistor 262 and an N-channel transistor 264 to drive an output 268 from the stepped up voltage $V_{LCD}$ through a resistor 270. The one of the lines 238 associated with the right lens is passed through a driver 272 to the gates of two complimentary coupled transistors, a P-channel transistor 274 and an N-channel transistor 276 to drive an output terminal 278 from the stepped up voltage $V_{LCD}$ through a resistor 280. This provides the right lens driver. $V_{AUD}$ provides audio power control to turn off the audio portion of the board under the control of the MCU 220. A separate driver 282 is provided for having the input thereof connected to the one of the lines 238 associated with the right lens and providing a sense output on a line 284 which is not utilized.

Figure 7D:
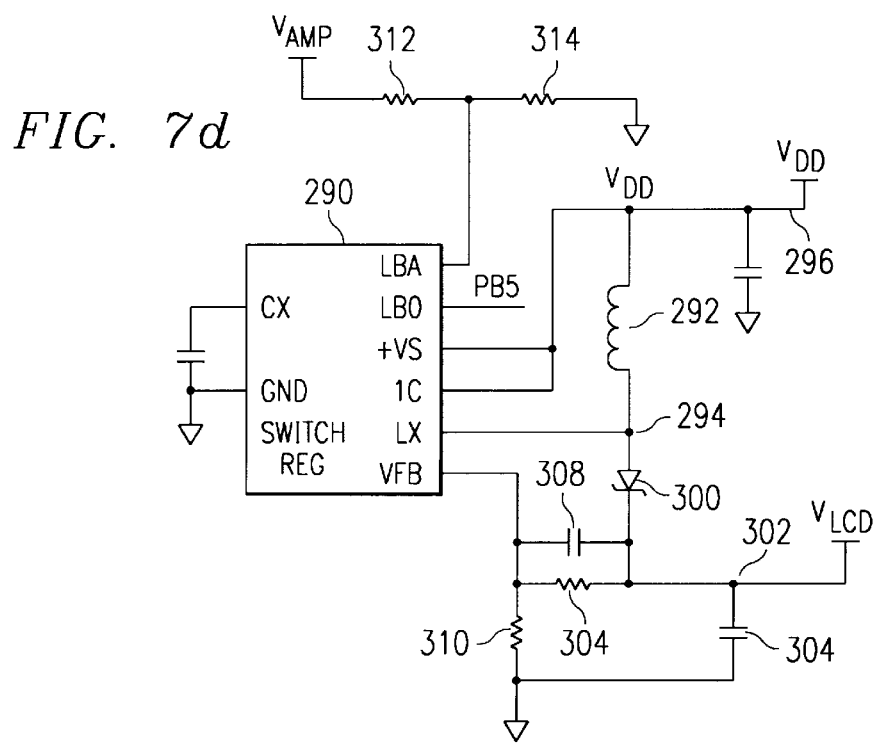

Referring now to FIG. 7d, there is illustrated a schematic diagram of the lens voltage set-up for generating the voltage $V_{LCD}$. A step-up switching regulator 290, of the type MAX630 manufactured by Maxim, is configured in a conventional manner with a switching inductor 292 connected across the inductor terminals with one side thereof connected to a node 294 and the other side thereof connected to a VDD terminal 296. A Schottky diode 300 has the anode thereof connected to node 294 and the cathode thereof connected to a node 302, this comprising the $V_{LCD}$ voltage. A capacitor 304 is connected between node 302 and ground. The node 302 is also connected through a resistor 306 to the VFB input of the switching regulator 290 with a capacitor 308 disposed in parallel with the resistor 306. A resistor 310 is connected between the VFB input and ground $V_{DD}$ is the power supply input. The mid-point of a resistive divider comprised of a resistor 312 and resistor 314 connected between the positive voltage supply VAMP and ground is input to a comparator input to the circuit 290.

Figure 7E:
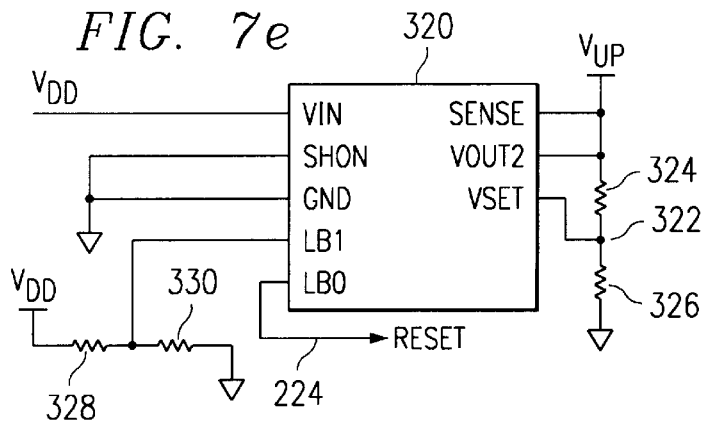

Referring now to FIG. 7e, there is illustrated a schematic diagram of a micro-power supervisor which is operable to receive the power-on sync voltage VDD, which is used as the input for the step-up voltage regulator of FIG. 7d. The supervisor of FIG. 7e utilizes an integrated circuit of the type MAX666, manufactured by Maxim, which is a micropower, low voltage regulator which regulates the power signal $V_{DD}$ down to $V_{UP}$, the power for the microcontroller 220. The integrated circuit 320 is operable to have the sense input connected to the signal $V_{up}$ that is operable to power the MCU 220 and also have the VSET input connected to a sense node 322, which is connected to the junction between two series connected resistors 324 and 326, with resistors 324 and 326 connected between the power supply voltage $V_{up}$ and ground. The input voltage is connected to node 296 with the voltage $V_{DD}$ disposed thereon with the reset signal on line 224 input on a terminal LBO and a scaled down voltage signal input to an input LBI, the scaled down voltage input signal received from the mid-point of two series connected resistors 328 and 330 that are configured as a voltage divider connected between the voltage $V_{DD}$ and ground. The LBI signal is a scaled down $V_{DD}$ input to an internal comparator for comparison to an internal reference to generate the reset signal and reset the microcontroller 220 if $V_{DD}$ falls below a threshold level.

Figure 7F:
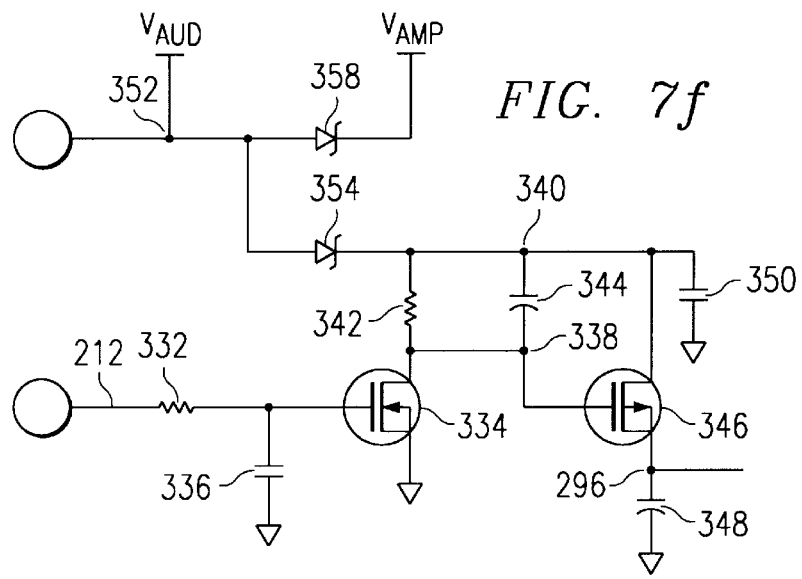

Referring now to FIG. 7f, there is illustrated a schematic diagram of the power on sync circuit. The power on sync circuit is operable to receive the output voltage from the sync preamp/detector 76 on line 212, this signal input through a resistor 332 to the gate of an N-channel transistor 334. A capacitor 336 is connected between the gate of transistor 334 and ground. The source of transistor 334 is connected to ground and the drain thereof connected to a node 338. Node 338 is also connected to the voltage VAUDB on a node 340 through a parallel connected resistor 342 and capacitor 344. Node 338 is also connected to the gate of a P-channel transistor 346, the source to the node 340 and the drain connected to voltage terminal 296 that supplies the VDD voltage. A capacitor 348 is connected between node 296 and ground and a capacitor 350 is connected between node 340 and ground. The battery voltage $V_{batt}$ is input on a terminal 352, which comprises the audio voltage VAUD. This is connected through a Schottly diode 354 to the node 340 to provide the VAUDB voltage. Similarly, the voltage VAM on a node 356 is provided by connecting node 352 to the anode of a diode 358, the cathode thereof connected to node 356. Therefore, whenever the sync signal is detected by the detector 76, line 212 will go high, turning on transistor 334 and pulling node 338 low. When node 338 goes low, transistor 346 will pull node 296 high, thus providing the voltage VDD.

Figure 7G:
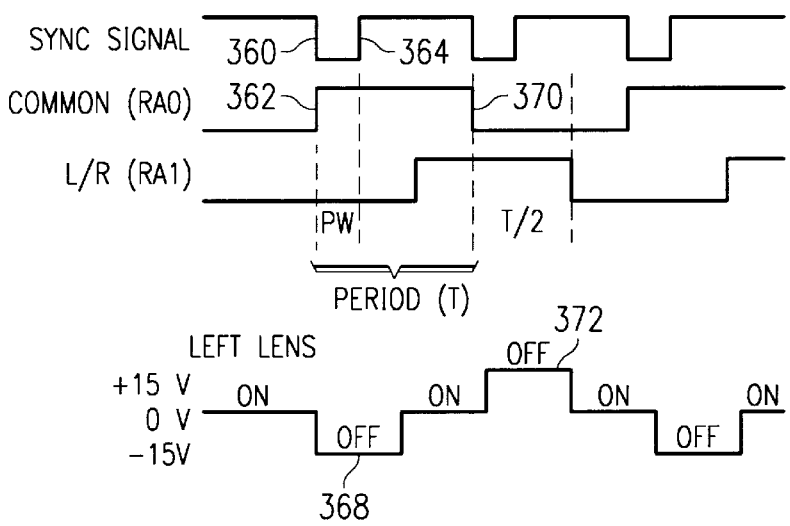
FIG. 7g illustrates a timing diagram for the lens driver.

Referring now to FIG. 7g, there is illustrated a timing diagram for the lens driver illustrating a sync signal waveform, a common waveform and the L/R control. It can be seen that the sync signal on a falling edge 360 is synchronized with a rising edge 362 of the common signal. After a rising edge 364 on the sync signal, a rising edge 366 on the L/R signal will occur. However, it is not necessary that the rising edge of the sync signal specify the pulse width of the lens driving signals, and it need not precede the rising edge of the L/R signal. The left lens signal is illustrated which varies between 15 volts, 0 volts and −15 volts. When the lens is on, it is at 0 volts. Thereafter, it must alternate in the off state between −15 volts and +15 volts. Therefore, whenever the common signal goes high at edge 362, a common voltage or ground is connected to the L/R input and +15 volts is connected to the common input of the lens, this resulting in a reverse polarity level 368. At edge 366, both the common and the L/R input are connected to +15 volts to result in 0 potential thereacross. At falling edge 370 on the common signal, the common signal is pulled back to ground, thus resulting in a reverse polarity signal at a level +15 volts on the lens drive signal, represented by a point 372 on the left lens waveform. As such, it can be seen that the lens is cycled off at the falling edge of the sync signal and then turned back on at the rising edge of the L/R signal and then turned off again at the next falling edge of the sync signal. However, for alternating falling edges at the sync signal, the polarity across the lens is reversed. This is a conventional operation for driving LCDs.

Figure 8:
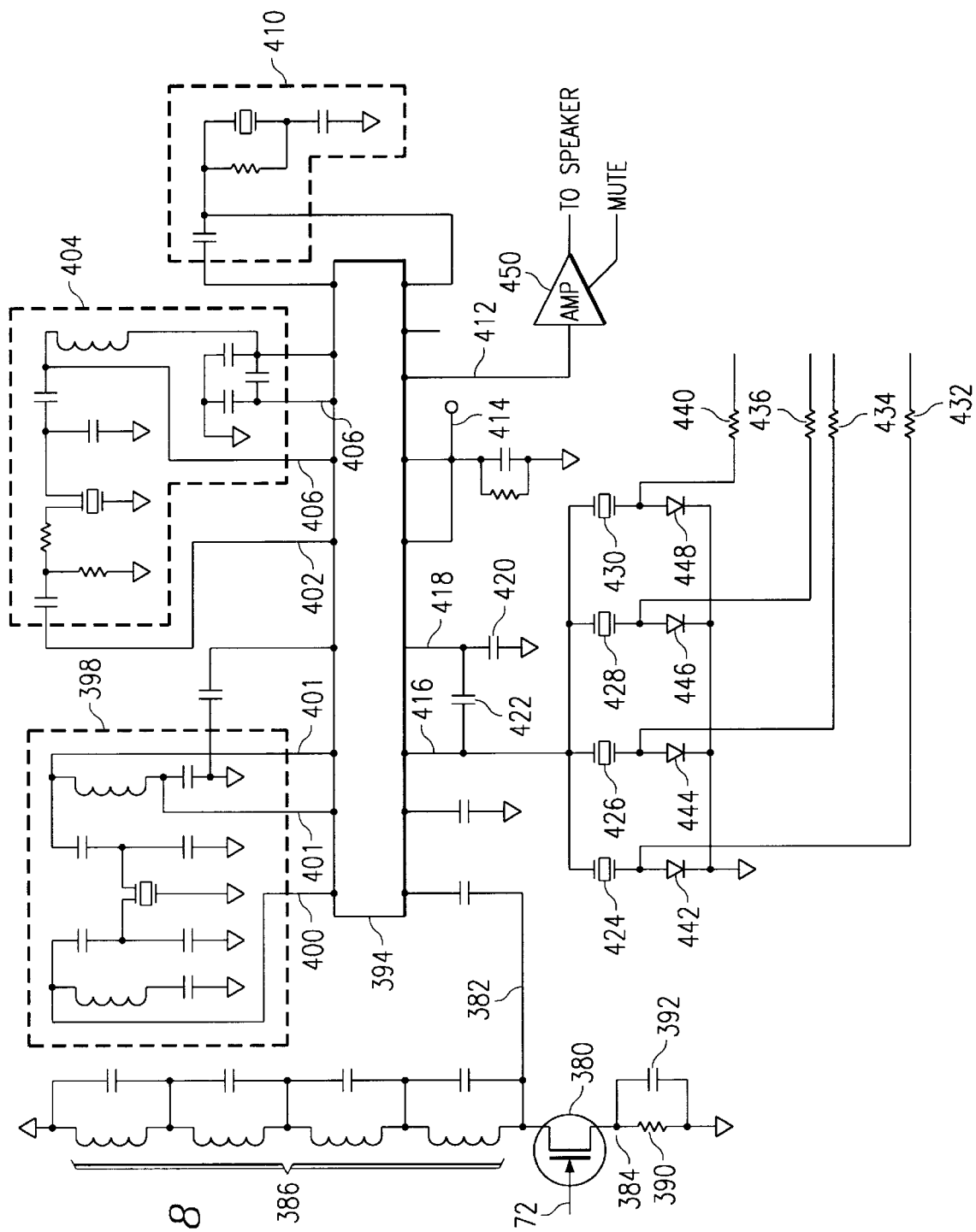
FIG. 8 illustrates a schematic diagram of one audio channel.

Referring now to FIG. 8, there is illustrated a schematic diagram of the audio receiver. The schematic of FIG. 8 refers only to one channel, the right channel. However, it should be understood that the left channel is identical, with the exception that different frequencies are selected. The signal on node 72 is input to the gate of an N-channel transistor 380 which has the source/drain path thereof connected between a node 382 and a node 384. A plurality of tank circuits 386 are connected in series between the node 382 and the voltage VREG. Voltage VREG is a voltage that is derived from the VDD voltage through a regulation circuit to provide a regulated voltage therefrom. In the preferred embodiment, there are four tank circuits, each comprised of a parallel connected inductor capacitor. This provides a bandpass filtering function. The node 384 is connected through a resistor 390 to ground, resistor 390 being paralleled with a capacitor 392. There is a similar preamp circuit disposed on the left channel for providing the appropriate filtering.

The right channel operates for four frequencies, there being a total of eight frequencies, such that four frequencies are associated with the right channel and four frequencies are associated with the left channel. This allows eight separate audio channels and, since they are binaural, this allows for four separate binaural channels. Of course, the number of channels is merely limited by the number of frequencies that can be utilized in the passband of the audio receiver.

Node 382 is connected to an input of a super heterodyne integrated circuit 394, which is of the type NE605, manufactured by Philips. This is a conventional circuit. The receiver 394 utilizes a 10.7 MHZ IF filter 398 which is connected between an IF signal on a line 400 that is output from an internal mixer, and an output provided on a line 401 as an input to an IF amplifier (not shown). The output of the internal IF amplifier is provided on a line 402, this then input to a 10.7 MHZ IF filter 404. This is input to an internal limiter (not shown) on lines 406, the output thereof input to an internal mixer (not shown) which also receives an input from a discriminator 410. This then provides the output signal on a line 412. Additionally, there is an internal function that is associated with this circuit that provides a measure of received signal strength, this being a Receive Signal Strength Indicator Signal (RSSI) on a node 414. This is utilized for testing purposes and squelch purposes.

An internal oscillator is provided across two nodes 416 and 418. Node 418 is connected through a capacitor 420 to ground, with a capacitor 422 connected across nodes 416 and 418. Node 416 is operable to be connected to one side of a crystal, the other side thereof operable to be connected to ground. In the present embodiment, four switchable crystals 424, 426, 428 and 430 are provided, each having one side thereof connected to the terminal 416. The other sides thereof are connected through resistors 432, 434, 436 and 440, respectively, to the select signals SEL4, SEL3, SEL2 and SEL1, respectively. Each of the other sides of the crystals 424–430 are connected through associated diodes 442, 444, 446 and 448, respectively, to ground. Therefore, when either of the signals SEL1–SEL4 is pulled high through the transistors 244–250 of FIG. 7b, this will cause current to flow through the selected one of the diodes 442–448 to bias the other side of the selected crystal 424–430. In this manner, the frequency range can be selected on the receiver 394.

The node 412 is connected through an audio amplifier 450 to provide the speaker drive signal, the amplifier 450 having a mute input. This is a low power audio amplifier of the type MC34119, manufactured by Motorola.

Figure 9A:
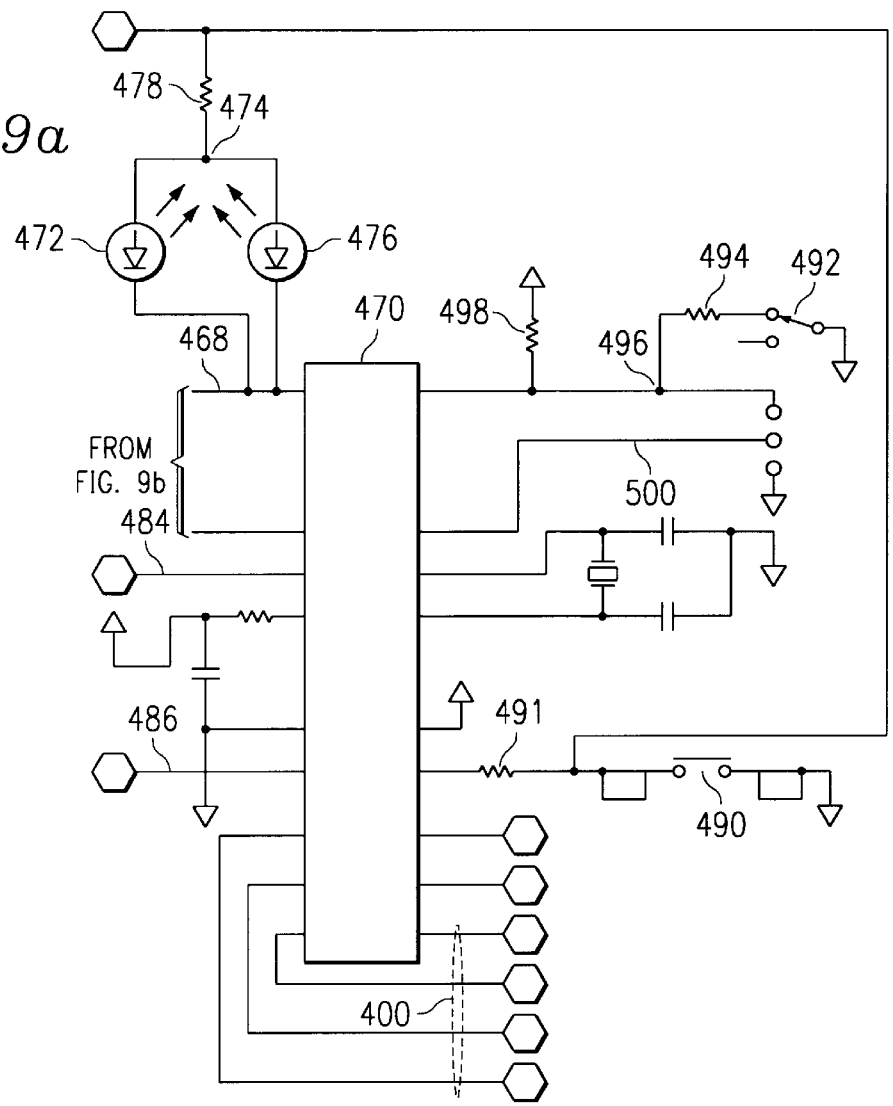
FIGS. 9a and 9b illustrate a schematic block diagram of the audio/sync receiver control function.
Figure 9B:
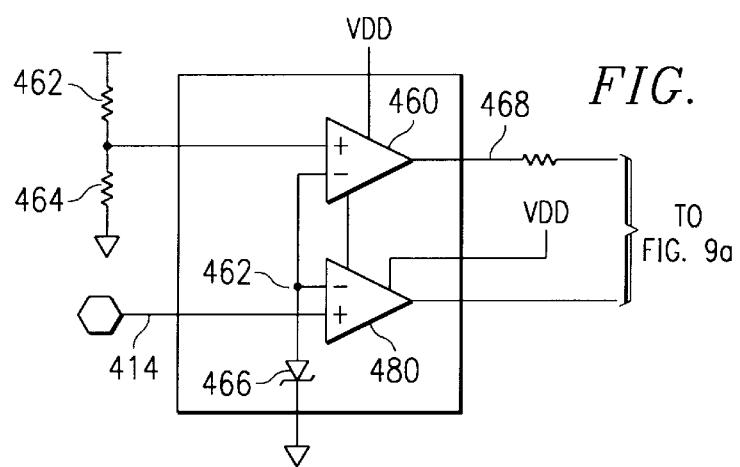

Referring now to FIGS. 9a and 9b, there is illustrated a schematic block diagram of a portion of the audio/sync receiver that provides the preferred embodiment of the MCU 98 and some of the control functions to interface with the user. A comparator 460 receives on the positive input thereof a voltage that is derived from a resistive divider comprised of two resistors 462 and 464 connected between the battery voltage VBAT and ground. The negative input of comparator 460 is connected to a node 462, which is connected to one side of a zener diode 466, this providing a reference voltage. This comparator 460 is powered by the voltage VDD. The comparator 460 determines whether the voltage of the battery has fallen below a predetermined value, as defined by the value of the resistors 462 and 464. This drives an output node 468 that is connected to an input of a micro-controller unit (MCU) 470 of the type PIC 16C61, manufactured by Microchip Technology, Inc. Additionally, there are provided two LEDs, a red LED 472 which is oriented such that the anode thereof is connected to node 468 and the cathode thereof is connected to a node 474, and a green LED 476, oriented in the opposite direction of LED 472 and connected in parallel therewith. Node 474 is connected through a resistor 478 to a second input of the micro-controller 470 through a resistor 491. Therefore, whenever node 468 is high and the other side of 478 is low, the green LED 476 will be on. The red LED 472 will be on under the opposite conditions.

A second comparator 480 is provided having the negative input thereof connected to the reference voltage of node 462 and the positive input thereof connected to the RSSI output from the audio receivers. This corresponds to the comparator 104 of FIG. 5. This provides an output that is connected to a separate input on the micro-controller 470. An Audio Off signal is an output on a line 484 from the microcontroller 470 to power down the audio section. The sync signal is received on a line 486 with the four crystal select signals XTAL1'–XTAL4' generated on lines 400. A push button switch 490 is provided for the user to momentarily connect a ground voltage through a resistor 491 to the input that is connected to the other side of the resistor 491. Therefore, whenever this is grounded and node 468 is high, the green LED 476 will turn on. This, of course, will be the normal operation, since the output of comparator 460 will be high when the battery voltage is good. As will be described hereinbelow, the user depresses the button 490 to input ground to the micro-controller 470, such that a channel can be selected when a User Channel mode is entered. This is a situation that occurs during the language selection in a theater environment. When the switch 490 is depressed, this will pull the cathode of the green LED low and it will be illuminated. Additionally, there is provided a switch 492 that is connected between ground and an input node 496 through a resistor 494. A pull-up resistor 498 is connected from node 496 to the voltage VDD. This is a theater/museum switch, such that, in one position, a walking tour arrangement will be selected for and, in the other position, a theater environment will be selected. The switch also changes the timeout on data invalid. The node 496 is labeled LCS$_{LR}$, which is the left-right control signal for the lenses. This is passed through an inverter to provide the right signal, with this node 496 providing the left signal. A common signal is provided on a node 500, these then comprising the lines 238 described above with reference to FIG. 7 and these input to the lens driver 101.

The overall operation of the system will be described with respect to Table 1, which Table 1 sets forth the various modes. There are various power defining states to define whether the MCU is powered, the sync receiver is powered, the IR string is powered, the audio system powered or the shutters are powered. The shutters are the LCD lenses, which are typically utilized only in the theater scenario, but can be utilized in a situation wherein a walking tour requires both the use of the shutters and the audio portion. This is referred to as a full operation headset system. Table 1 is as follows:

TABLE I

| POWER STATE | OPER STATE | STATE CONDITIONS | SECTIONS POWERED | Comments |
|---|---|---|---|---|
| 1 | Asleep | Battery installed - no user action sync < 8 Hz | MCU | Sleep after 5 seconds. |
| 2 | Wake up sense | Battery installed - button pushed, no IR sync modulation | MCU sync receiver IR string | Timeout after 2 seconds. IR and Audio power down. |
| 2 | Wake up detected | Sync > 8 Hz detected | MCU sync receiver IR string | |
| 3 | Self test | 37 Hz < Sync < 43 Hz<br>Pulse width = 1 ms: mute-audio pwr off.<br>Pulse width = 2 ms: user channel<br>Pulse width = 3 ms: channel #1<br>Pulse width = 4 ms: channel #2<br>Pulse width = 5 ms: channel #3<br>Pulse width = 6 ms: channel #4<br>Pulse width = 7 ms: user channel<br>Pulse width = 8 ms: mute-audio pwr off. | MCU sync receiver IR string audio shutters (turning on and off slowly) | MCU allows channel changes |
| 4 | Audio only | 8 Hz < Sync < 14 Hz or<br>15 Hz < Sync < 19 Hz<br>20 Hz < Sync < 28 Hz<br>Pulse width = 1 ms: mute-audio pwr off.<br>Pulse width = 2 ms: user channel<br>Pulse width = 3 ms: channel #1<br>Pulse width = 4 ms: channel #2<br>Pulse width = 5 ms: channel #3<br>Pulse width = 6 ms: channel #4<br>Pulse width = 7 ms: user channel<br>Pulse width = 8 ms: mute-audio pwr off. | MCU sync receiver IR string audio (unless Pulse width = 1 ms or 8 ms) | MCU allows only one channel change |
| 5 | Shutters only | 43 Hz < Sync < 100 Hz<br>Pulse width = 1 ms or 8 ms | MCU sync receiver IR string shutters | |
| 3 | Full operation | 43 Hz < Sync = 100 Hz<br>Pulse width = 1 ms: mute-audio pwr off.<br>Pulse width = 2 ms: user channel<br>Pulse width = 3 ms: channel #1<br>Pulse width = 4 ms: channel #2<br>Pulse width = 5 ms: channel #3<br>Pulse width = 6 ms: channel #4<br>Pulse width = 6 ms: user channel<br>Pulse width = 8 ms: mute-audio pwr off. | MCU sync receiver IR string shutter (flashing at sync rate) audio (unless Pulse width = 1 ms or 8 ms) | MCU allows only one channel change |
| 8 | Set Max Channel | 29 Hz < Sync < 37 Hz | MCU sync receiver IR string shutters | Allow channel change and set max channel to FORCE CHANNEL value. |

Figure 10A:
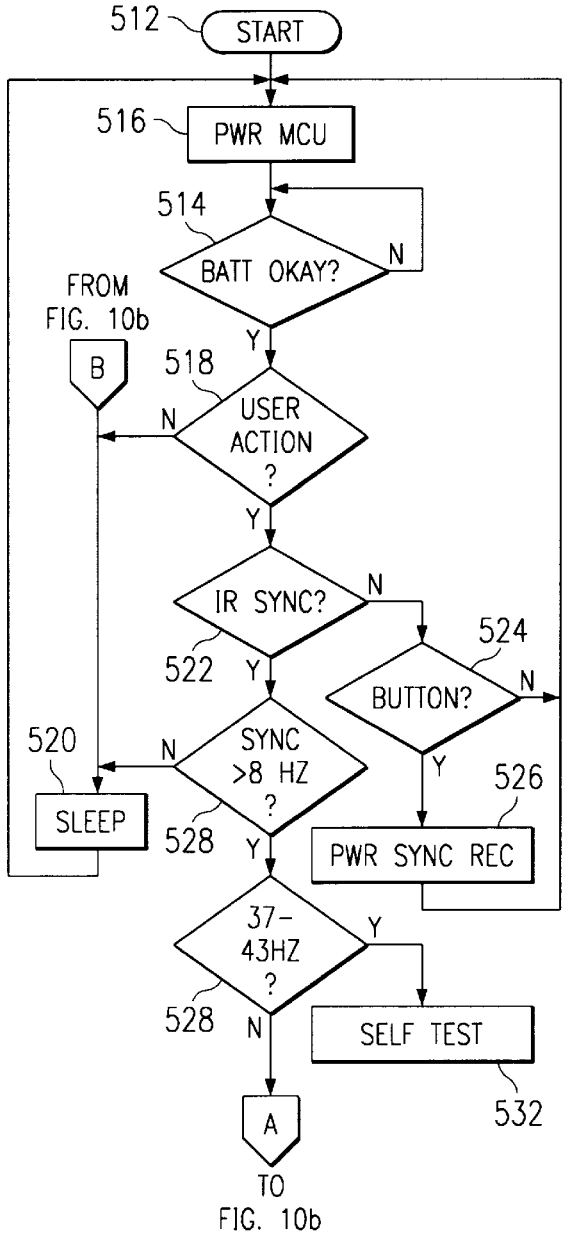
FIGS. 10a and 10b illustrate flowcharts depicting the overall operation of the receivers.
Figure 10B:
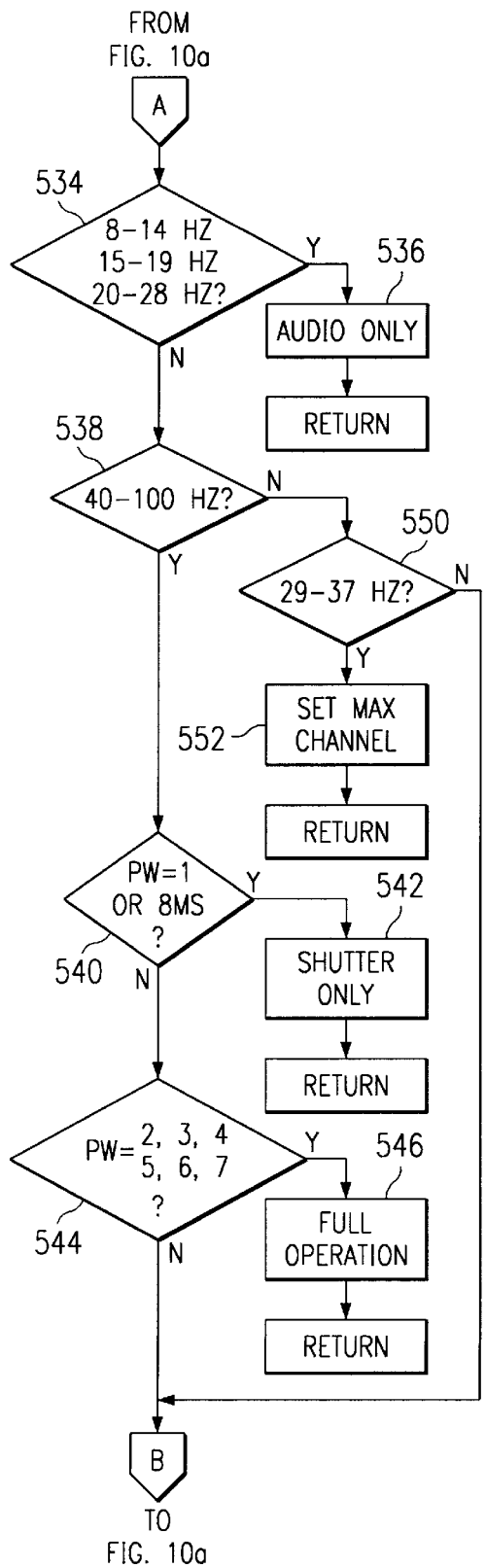

Referring now to FIGS. 10*a* and 10*b*, there is illustrated a flowchart depicting the overall operation as noted in Table 1. The flowchart is initiated at a start block 512 and then proceeds to a function block 516 to power the MCU and then to a decision block 514 to determine if the battery level is acceptable. If not, the program will return to the input of decision block 514. When a battery voltage is acceptable, the flowchart will flow to a decision block 518 to determine if there is any user action. If not the program will flow along an "N" path to a sleep function block 520 and then to the decision block 514 and the program will not be executed. This is determined by comparing battery voltage to an operational threshold and, if it exceeds this threshold, the battery is declared present. When user action is detected, the flowchart flows to a decision block 522 which determines if a sync signal has been received. If the sync signal has not been received, then the flowchart flows to a decision block 524 to determine if the button has been pushed by the user. If not, the program will flow along an "N" path back to decision block 514. If a button has been pushed, the program flows along a "Y" path to power the sync receiver and then process the button commands to store the selected channel by the user. The flowchart will then flow back to decision block 514.

When the sync signal is detected, the flowchart will flow from decision block 522 to a decision block 528 to determine if the sync rate is greater than 8 Hz. If not, the program will flow back to the input of decision block 514 through the sleep block 520. When the sync rate is above 8 Hz, the flowchart will flow to a decision block 530 to determine if the sync rate is between 37 and 43 Hz, wherein it will then flow to a self-test block 532. If it is not in this range, the flowchart flows to a decision block 534 to determine if it is between 8 and 14 Hz, 15 and 19 Hz, or 20 and 28 Hz. If so, the flowchart flows to a function block 536 to define it as an audio only mode. If it is not in that range, the flowchart flows to a decision block 538 to determine if the range is between 43 and 100 Hz. If so, the flowchart will flow to a decision block 540 to determine if the pulse width is 1 ms or 8 ms. If so, this will define a shutter only mode and turn power off using line 484 of FIG. 9. If not, the flowchart will flow to a decision block 544 to determine if the pulse width is set to 2, 3, 4, 5, 6 or 7 ms. If so, this indicates a full operation function block 546. If it is not 2 and 7 ms inclusive, the flowchart will flow along an "W" path and return to the decision block 520. If decision block 538 determines that the range was not 43–100 Hz, the output of decision block 538 would flow to a decision block 550 to determine if the sync rate was between 29 and 37 Hz. If so, the program would flow to a function block 552 to set the maximum channel. If it was determined that none of the sync rate ranges were present, the program would flow back to the input of decision block 514 through sleep block 520.

Figure 11A:
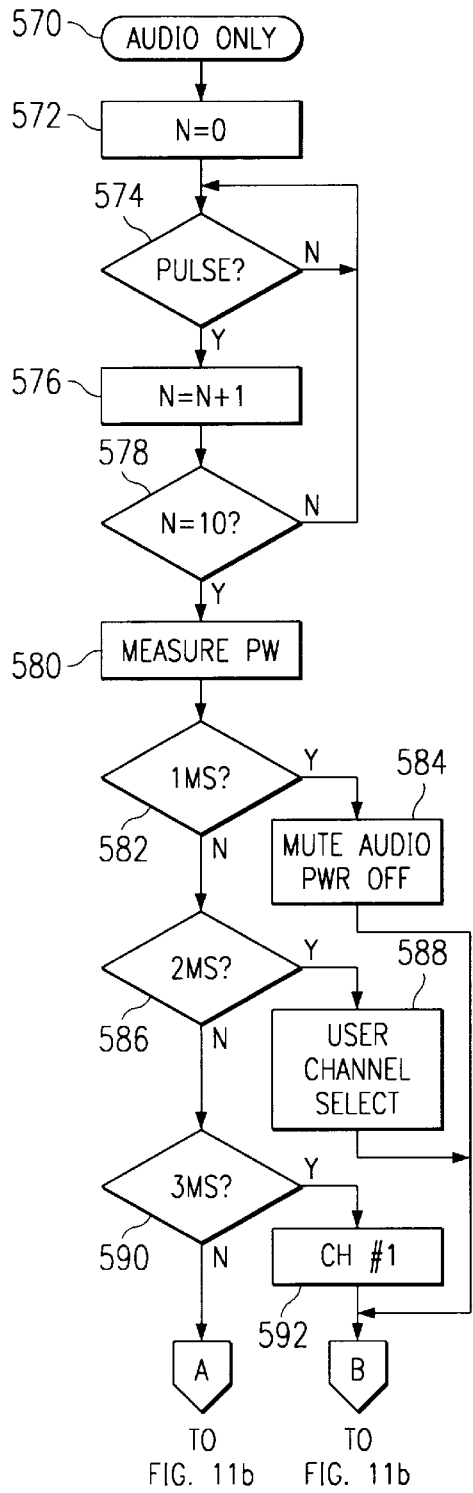
FIG. 11 illustrates a flowchart depicting the detailed operation of the audio only mode.
Figure 11B:
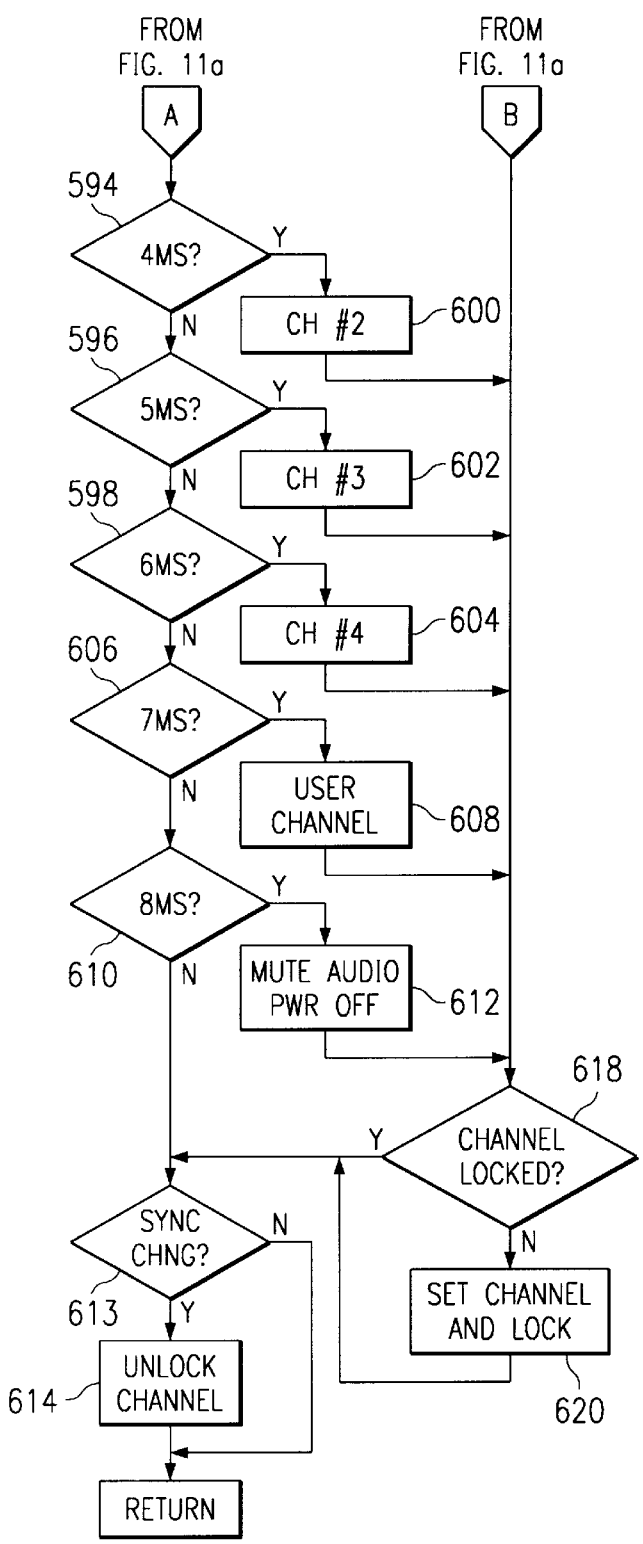

Referring now to FIGS. 11a and 11b, there is illustrated a flowchart depicting the operation of the Audio Only mode. The flowchart is initiated at a block 570 and then proceeds to a function block 572 wherein N is set equal to 0. The program then flows to a decision block 574 to determine if a pulse has been received. If not, the program will flow back to the input of decision block 574. When a pulse is received, the program flows to a function block 576 to increment the value of N and then to a decision block 578 to determine if the value of N is equal to 10. If not, the program will flow back along the "A" path to the decision block 574. This will continue until ten pulses have been received. At this time, the program will flow along a "Y" path to a function block 580. The loop back operation with respect to decision block 578 and decision block 574 is to require at least ten valid pulses to be received, a valid pulse defined as a pulse having the same pulse width. If a pulse of another width is received, this will cause the system to reset—the counter N resets and the new pulse width is recognized after N=10.

The function block 580 determines what the pulse width is of the pulses being received. This is measured and then the program flows to a decision block 582 wherein it is determined whether the pulse width is 1 ms. If so, the program flows to a function block 584 wherein the system enters a mute operation and the audio power is turned off. If the pulse width is not 1 ms, the program will flow to a decision block 586 to determine if the pulse width is 2 ms. If so, the program will flow to a function block 588 to utilize or select the user defined channel. As described hereinabove, each user has the ability to push a button to select one of the four channels on which to receive audio information. Once this selection is made and stored, it is then only necessary to enter this mode via receiving a command in the form of a 2 ms pulse width in the Audio Only mode or Full Operation mode.

If the 2 ms pulse width was not received, the program flows to a decision block 590 to determine if the pulse width is 3 ms. If so, the program flows to a function block 592 wherein channel 1 is selected. Subsequent decision blocks 594 associated with a 4 ms determination, 596 associated with a 5 ms determination and a decision block 598 associated with a 6 ms determination will route the program to respective function blocks 600, 602 and 604 where selection of channels 2, 3 and 4, respectively, will be actuated.

If none of channels 14 have been selected, the program will flow from decision block 598 to a decision 606 to determine if the pulse width is 7 ms. If so, the program will flow to a function block 608 to select the user defined channel. If the pulse width is not 7 ms, the program will flow to a function block 610 to determine if the pulse width is 8 ms. If so, the program will flow to a function block 612 to enter the mute operation and turn the audio power off. If it is not 8 ms, the program will flow to a decision block 613 to determine if there has been a change in the sync frequency. If not, the program will flow to a return block to the main program and, if so, the program will flow to a function block 614 to unlock a channel, which will be described hereinbelow. The program will then flow back to the input of the return block.

Each of the function blocks 584, 588, 592, 600, 602, 604, 608 and 612 each flow to a decision block 618 to determine if the channel is locked. The channel is locked whenever a sync change has occurred and a pulse width is determined and a channel selected or a mode of operation selected. Once a mode of operation is selected, it is then necessary for a synchronization frequency change to occur in order to allow another channel to be selected. Once selected, the channel is locked and pulse width changes thereafter will not change it. Therefore, if the channel is locked, the program will flow along a "Y" path from decision block 618 to the input of decision block 613 to determine if a synchronization change has occurred. If not, the program will continue to follow this path. However, once a synchronization change has occurred, the program will flow to decision block 618, after a channel has been selected, and then set or select that channel and then lock it. This is indicated by a function block 620. The program will then flow back to the input of decision block 613 and continue along this path. This won't occur until a synchronization change has occurred and the channel is unlocked at function block 614 and then the program will flow to function block 620 to set the new channel.

Figure 12:
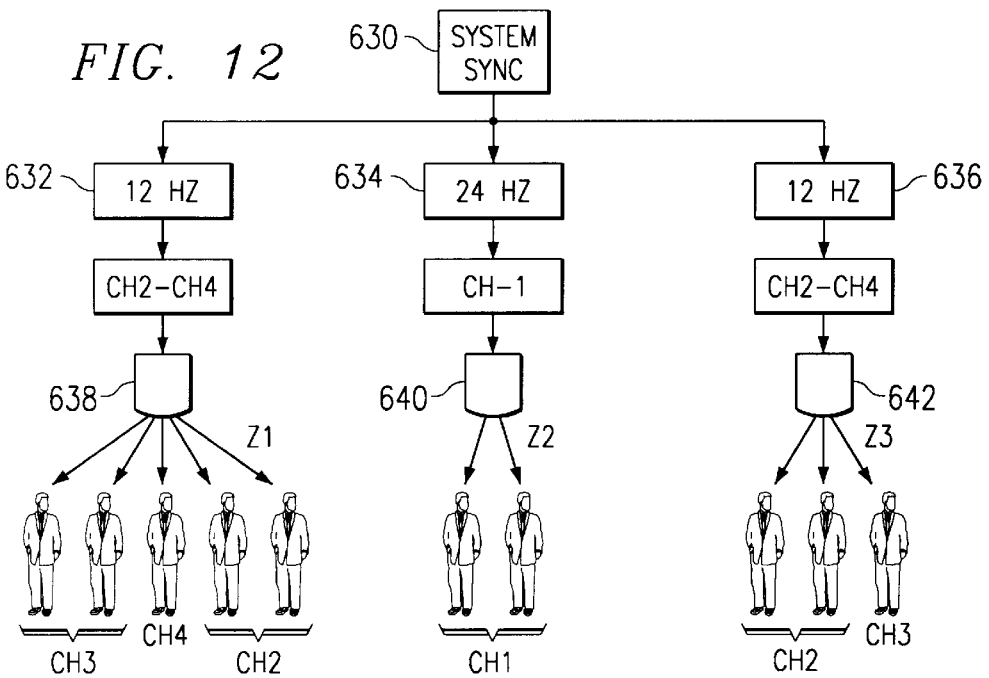
FIG. 12 illustrates a diagrammatic view of the staggered audio only mode.

Referring now to FIG. 12, there is illustrated a diagrammatic view of three zones, Zone 1, Zone 2 and Zone 3, Zone 1 separate from Zone 3 but, Zone 1 and Zone 3 adjacent to Zone 2. There is illustrated a general system synchronization device 630 which is operable to generate the sync signal which is delivered to three transmitters 632, 634 and 636. Transmitter 632 has a synchronization rate of 12 Hz, transmitter 634 has synchronization rate of 24 Hz and transmitter 636 has synchronization rate of 12 Hz. In Zone 1, the transmitter is operable to transmit over three channels, channels 24, this operating in an Audio Only mode. However, the transmitter 632 is limited to only transmitting on channel 2, channel 3 and channel 4. The transmitter 634 is limited to transmitting only on channel 1, whereas transmitter 636 is operable to transmit on channels 24. Each of the transmitters 632–636 has associated therewith an emitter array 638, 640 and 642, respectively.

It can be seen that in Zone 1, there are multiple listeners listening to audio channels 2, 3 and 4. When a listener moves from Zone 1 to Zone 2, that listener experiences a sync change and, upon noticing it, will then look for a valid pulse width. Zone 2 transmits only on channel 1 and, therefore, will only transmit pulse widths of 3 ms. As soon as all of the pulses have a pulse width of 3 ms, the system will recognize this and will then perform the channel selection. However, alternately, the system can recognize that it previously had received pulse widths greater than 3 ms and recognize that a pulse has been inserted at the higher frequency. The system can contain the sophistication to allow it to select this pulse width, if necessary. However, it is only necessary to allow the user to move far enough out of the range of Zone 1 to allow it to receive only on channel 1. Typically, channel 1 is background music that is played between exhibits. Further, the transmitter 634 and Zone 2 could be set to a mute channel with a pulse width of 1 ms or 8 ms.

When the user traverses between Zone 2 and Zone 3, it will recognize another sync change from 24 Hz to 12 Hz. Of course, this will occur only after the transmitter power from transmitter 634 is lost, such that the extra pulse is removed at the reduced sync frequency. When this occurs, the pulse width associated with the transmit command for channels 2, 3 or 4 will be received. However, it is important to note that only one command can be transmitted.

The typical scenario for a walking tour is that one set of individuals or group of individuals will come in to a zone at different times. Each zone will have a predefined program of a predetermined length to be played over the audio channel. It is desirous that, when the individual enters the zone, the program be initiated upon that event occurring. In order to facilitate this, the system must first sense that the person or group has entered the transmitting area and then initiate the program on a given channel. However, the problem occurs when the second individual or group of individuals enters the zone and desires to initiate the program. First, their headsets will receive the channel command that is being transmitted. If the channel command is the channel associated with the already initiated program, then that individual or group of individuals could receive the program in the middle of the program, this not a desirous situation. The present system utilizes a staggered start/stop method to ensure that as many individuals as possible can be accommodated upon entering the zone at different times. For example, if a first individual enters the zone, his presence is sensed by either an infrared or motion detector or by merely pressing a button on the display to initiate the program. When the program is initiated, the system will select a channel for transmission of audio information and transmit this command to the receivers in its transmitting area. The receivers will then receive this command and select the channel and then "lock" their receivers on that channel. The transmitter will then initiate transmission of the audio program. When the next individual enters the zone, this system will again detect that presence. If a predetermined period of time has elapsed since the program was initiated, for example, one minute, it is desirous to start the program from the beginning of the program for that individual. To facilitate this, this system first senses the presence of the individual and then sends out a command for another channel. Even though the individual with the headset that is already listening to the program receives this new channel select command, that receiver is locked and the previous individual will not have the channel associated with its receiver changed. Only the new listeners will have their receivers locked to a different channel. Once set to that channel, they again are locked and will receive the new program on the new channel that is initiated at the beginning of the program. This will continue until all of the channels are utilized. Once all the channels are utilized, the system will continue to transmit the last channel command and the associated pulse width until a channel is free. A delay can be implemented, such that subsequent individuals that enter immediately after the initiation of the program will be directed to the same channel until a predetermined amount of time has elapsed. After this time, the next channel will be the select channel and any individuals entering the zone thereafter will receive information on the next channel, the initiation of the program associated therewith occurring upon the sensing of the first individual entering the zone.

By way of example, if large exhibit floors were provided with many vendor areas, each with its own program material, this would require the receiver to handle up to four different languages. Each vendor area is separately illuminated with spot like type emitter panels so there would be a separation between the zones. Each vendor area would then have its own four-channel transmitter, a channel provided for each language. Users then would enter the exhibit floor through a staging area where they receive their headset and then manually select the language they wish to hear with the button. The headset automatically stores this information. As the users leave the staging area, they also leave any IR field, which causes the receiver to automatically go into mute state and then sleep mode if the duration is long enough. Upon arriving on the exhibit floor, users are free to visit any vendor exhibit in any order. As they enter the vendor area, their receivers automatically unsquelch and switch to the stored language channel (set in the staging area) and the user joins the narration program already in progress in the language of their choice. In this mode, they cannot have individualized start/stop times, since there are four different languages in the present embodiment utilizing four channels. However, if sufficient channels were provided for each language, then this could be facilitated.

In this example, each vendor exhibit would have a four-channel transmitter continually sending four languages on the four channels. The common area is sending 12 Hz sync pulses with a mute pulse width. As the user enters the vendor exhibit zone IR field, the receiver would receive the command to use the previously selected channel, the user channel. Since program material is available, the unit then un-mutes and the user hears the language of choice on the channel that was selected by the user. If the user changes his/her mind and leaves the exhibit area to visit another, operation is totally automatic and seamless, i.e., the receiver simply stops receiving the current vendor area material and begins receiving the new vendor program material in the correct language, this facilitated simply by the user walking between zoned areas.

Figure 13:
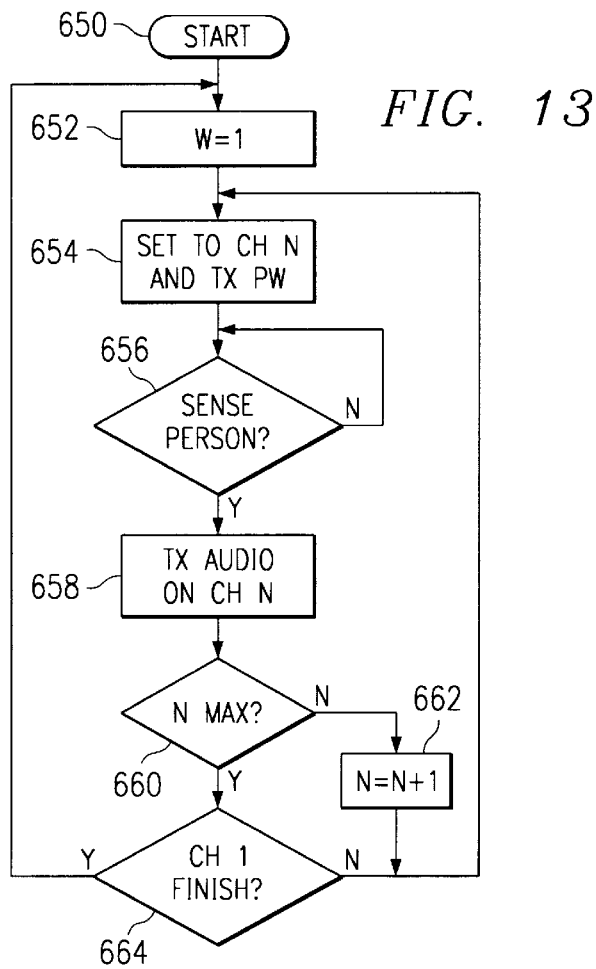
FIG. 13 illustrates a flowchart for the transmitter operation in the staggered mode.

Referring now to FIG. 13, there is illustrated a flowchart for the operation of the transmitter during the staggered start/stop operation described above. The program is initiated at a start block 650 and then proceeds to function block 652 to set the value of N equal to 1. The program then flows to a function block 654 to set the internal selected channel to the value of N and then transmit this pulse width as a command. The program then flows to a decision block 656 to determine if a person or individual has been sensed. As described hereinabove, the sensing operation is either the depression of a switch by an overt act of the individual or by sensing the presence of the individual via some type of motion sensor, electric eye, or other such device. Until a person is sensed, the program will flow along an "N" path back to the input of decision block 656. Once a person is sensed, the program will flow along a "Y" path to a function block 658 to transmit the audio on the selected channel. The program will then flow to a decision block 660 to determine if the value of N is maximum. If not, the program will flow to a function block 662 to increment the value of N and then flow back to the input of the function block 654 to set the command to the next higher pulse width and associated channel. When the next person is sensed, they, of course, have already received the transmitted command and the program will be initiated upon sensing. This will continue until all the channels have been utilized. If the value of N is maximum, the program will flow along a "Y" path from decision block 660 to decision block 664 to determine if the program on channel 1 is finished. If not, the program will flow back to the input of function block 654 to continue transmitting the command of the last channel. When channel 1 is finished its program, the program will flow along the "Y" path from decision block 664 to the input of function block 652 to again provide channel 1 as the selected channel.

In a theater setting, the pulse width information is utilized to convey to the receiver information regarding use of a user selected channel. In this mode, the available commands would be as follows:

pulse width=1 ms: mute
pulse width=2 ms: user channel
pulse width=3 ms: channel #1 only available
pulse width=4 ms: channels #1 and #2 only available
pulse width=5 ms: channels #1, #2 and #3 only available
pulse width=6 ms: all channels available
pulse width=7 ms: user channel
pulse width=8 ms: no channels available (audio board off/shutters only)

If, for example, a theater has only two languages available (channels 1 and 2), it is possible to prevent the user from selecting channel 3 or channel 4, thus allowing all of the available emitter panel power to be devoted to channels 1 and 2. In this case, the transmitter would broadcast a 4 ms pulse width telling the receiver that two channels are available. A jumper inside the receiver (not shown) determines how the receiver should respond to the pulse width information. The pulse rate (sync frequency) information would remain as described in the above table. Alternately, the "SET MAX CHANNEL" frequency could be utilized to determine which channels are available.

Figure 14:
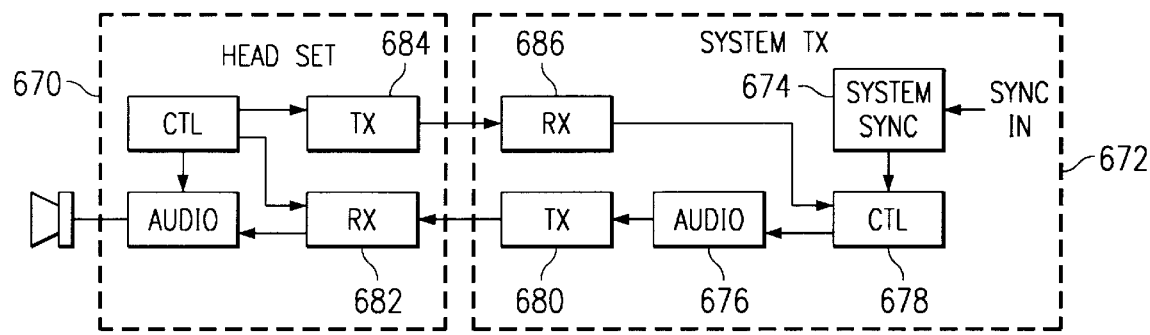
FIG. 14 illustrates a block diagram of the receiver and transmitter depicting an alternate embodiment.

Referring now to FIG. 14, there is illustrated a block diagram for a two-way transmission embodiment. In FIG. 14 there is illustrated a receiver 670 and a system transmitter 672. The system transmitter 672 has a system sync block 674 and an audio block 676, the shutter operation not illustrated. The audio block 676 is controlled by a control block 678 which receives synchronization information from the synchronization block 674. An emitter array 680 is provided for transmitting information to the receiver 670, which receiver 670 has a receiver 682 associated therewith. The operation up to this point has been as described hereinabove. However, in addition to the receiver 682 at the receiver 670, the receiver 670 also contains a transmitter 684, which transmitter 684 transmits on a separate frequency apart from the transmitter 680 and the receiver 682. This could be a wireless radio frequency or it could be an optical IR channel. The only requirement is that a transmitter 684 be provided in the receiver 670 and a corresponding receiver 686 be provided in the system transmitter 672 to provide a separate and independent communication path.

The use of a two-way communication path would allow for two things. First, information now can be transmitted to the system transmitter for the purpose of determining that the headset is within its transmit range. Additionally, ID information can be transmitted to the transmitter with additional configuration information. For example, the desired channel on which information is to be received could be transmitted to the system transmitter from the headset, such that the system transmitter will then initiate the desired information to the headset. For example, in a security mode, one individual may have a unique access to a particular channel in a zone. This information would not be transmitted until the appropriate individual were in the zone.

When the user initially receives the headset, the headset is in a powered-off mode of operation. The user then merely pushes the button on the side of the headset, which instructs the MCU to start running and wait to be commanded into some operational state by the IR link. Alternately, when the headset is powered up, if it is within a sync field, it will see a valid sync pulse within the five second period and will continue operating. However, after five seconds, the system will power down and go to sleep and wait for some user operation to wake it up.

Once the button is pressed and the MCU detects a valid command, the receiver enters the appropriate operational mode and may, depending on the mode, begin to use the switch for audio channel selection. This switch is utilized in the user mode only or the set max channel mode. When in this mode, hereinafter referred to as "user channel mode", the user may change audio channels by pushing the button.

Although not implemented in the preferred embodiment, one method of operation would be as follows. The first push of the button on the headset that is "awake" causes the LED to indicate which channel has been selected, as described above, but does not change the channels. If the button is pushed again within some time out period (ten seconds in the preferred embodiment), then the channel is changed to the next higher channel, i.e., channel 4 changes to channel 1, and the LED blinks n times for the channel number n to reflect this change. After the time out period, pushing the button merely causes the LED to indicate the selected channel and does not change the channel.

The button may also be utilized to enter an enhanced test mode. If the button is pressed and held down while the battery is installed, the red LED flashes red until it receives a valid sync signal. This is included to make photo-diode failures more evident to the user. Without this feature, a failure in the sync signal chain would be indicated by an absence of a red or green LED flash.

An internal switch (not shown) is accessible through a cover on the headset. This switch is utilized to select the default data channel absent time out. The standard time out is two minutes to conserve battery life. If a receiver does not see valid data for two minutes, it goes to sleep. The user then must press the button to wake it up. In a walking tour application, the user may be out of an IR field for extended periods of time. This is especially true for exhibits that have few panels spread out with no wide-area emitter panels to cover the gaps. Selecting the non-theater mode increases the default time out to infinity.

Visual indications regarding the above-described modes of operation are generally noted by the user via the LED indicator. During the time the user has the headset in his/her possession and no modulated sync carriers are being emitted from emitter panels, i.e., the sync modulation is less than 8 Hz, no illumination of the LED will occur even if the user pushes the button. When the sync modulation exceeds the 8 Hz rate and a single button push by the user occurs, the receiver then "wakes up", i.e., the MCU starts looking for commands over the IR data link. However, it should be understood that multiple LEDs as described above could be utilized, or a liquid crystal display panel could be utilized to provide more information.

The red LED is utilized to indicate a fault condition. A solid red LED indicates a battery fault. When in Test Mode, failure of self test is detected by reading an RSSI bit from the receiver. The MCU indicates the self test failure by a flashing red LED.

Initiation of self test mode does not light either LED. Successful completion of a self test is indicated by a flashing green LED. The rate of flash is determined by the rate of change of the pulse width information. The LED flashes the status (red-fail, green-pass) on successful determination of the pulse width associated with forcing the system to channel 1. The rate at which the lenses switch is also determined by the rate of pulse width change. Lens change occurs whenever the pulse width is associated with a force to channel 1 (3 ms) and the user channel pulse width (2 or 7 ms) or channel 3 select (5 ms). When the transmitter is forcing the channel setting, the button is ignored by the receiver, unless the Set Max Channel Mode (32 Hz) or the User Channel. Mode (Pulse Width=2 or 7 ms).

Figure 15A:
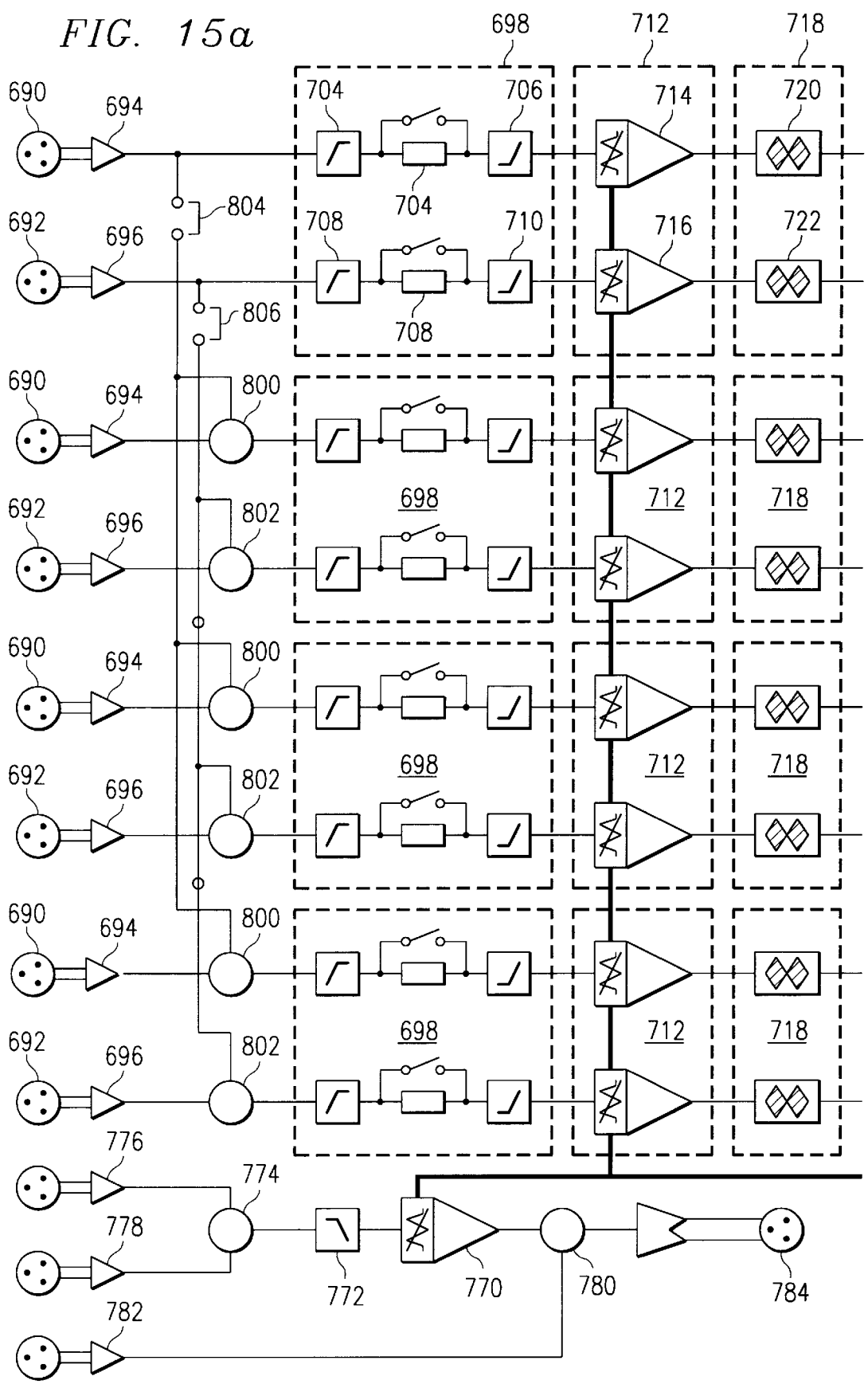
FIG. 15 illustrates a block diagram of the system transmitter.
Figure 15B:
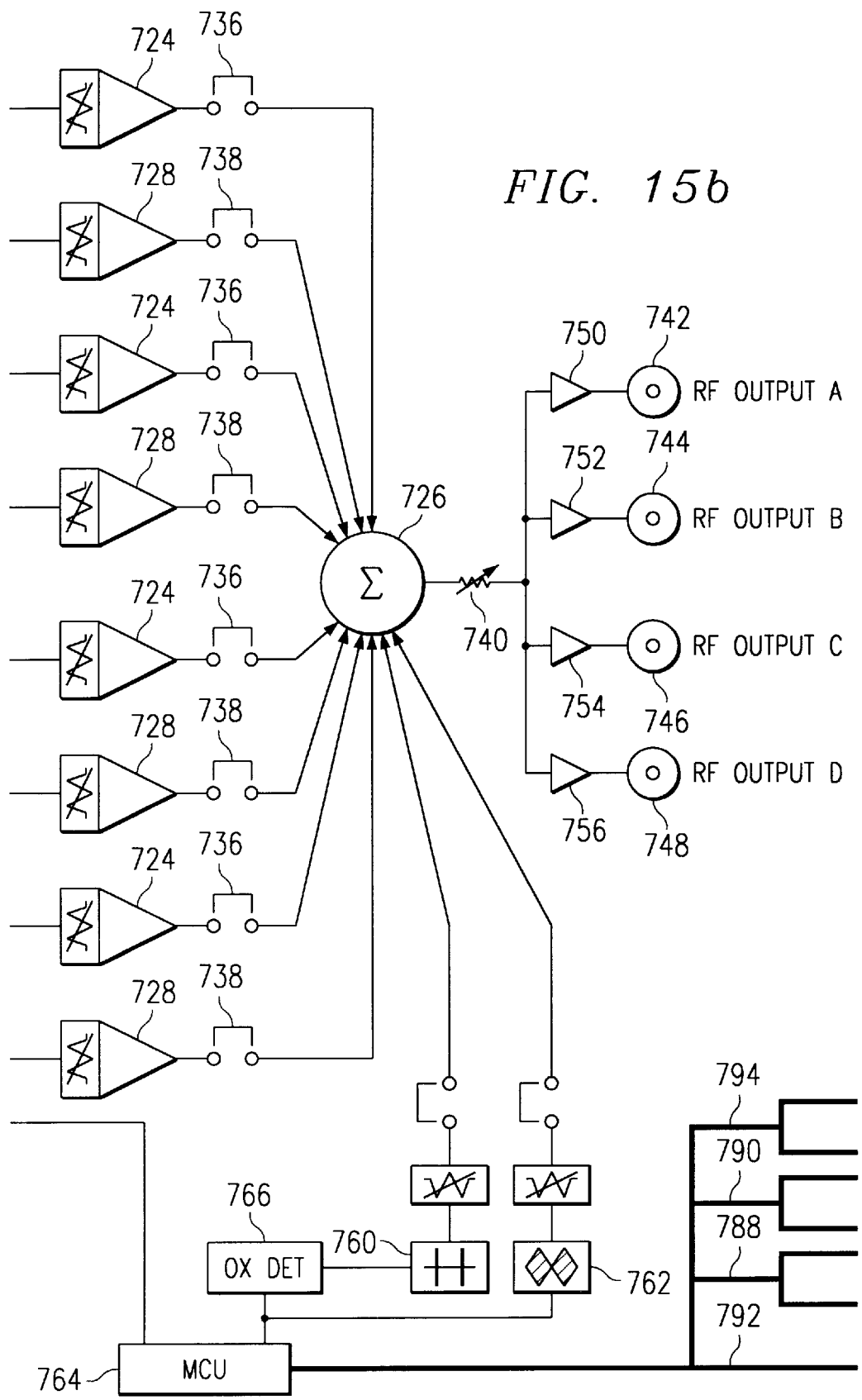

Referring now to FIG. 15, there is illustrated a block diagram of the transmitter. Each of the transmitters have four audio channels, each audio channel referred to as PSE1, PSE2, PSE3 and PSE4, each having left and right inputs 690 and 692. They are input through amplifiers 694 and 696, respectively, to a filter device 698. The filter device is comprised of a crossover device 700 for the left channel and a crossover device 702 for the right channel. An equalizer circuit 704 is disposed in the left channel between the crossover circuit 700 and a pre-emphasis circuit 706. Similarly, an equalizer 708 is disposed in the right channel between the crossover circuit 702 and a pre-emphasis circuit 710. The outputs of pre-emphasis circuits 706 and 710 are input to a limiter 712, the limiter 712 having a left channel limiter 714 and a right channel limiter 716 disposed therein. The output of the limiters 714 and 716 are input to a modulator 718 having a left channel modulator 720 and a right channel modulator 722 associated therewith. The left channel modulator 720 is output through a potentiometer 724 to a summing circuit 726 and the right channel limiter 722 is input through a potentiometer 728 to the summing circuit 726. Each of the signal paths for the limiter 720 and 722 through the potentiometer 724 and 728 are passed through an on board connector 736 and 738, respectively. These switches 736 and 738 can be removed to disable the channels.

The output of the summing junction 726 is passed through a potentiometer 740 to set the level thereof to four separate output terminals 742, 744, 746 and 748, respectively, through drivers 750, 752, 754 and 756, respectively. The RF output terminals are connected to the base of a driving transistor which is operable to drive an emitter diode. Typically, there are plurality of transistors having the gates thereof connected to each of the output terminals 742–748, such that there are four arrays.

In addition to the outputs of the modulators 718, the summing junction is also operable to receive the output of an ASK modulator 760 and a frequency switch key (FSK) modulator 762. The ASK modulator 760 is operable to modulate the carrier at a frequency of 76 kHz, whereas the FSK modulator is operable to modulate a carrier of 2.45 MHZ. The FSK modulator 762 and ASK modulator 760 are controlled by a micro-controller unit (MCU) 764. The ASK modulator 760 is further controlled by a zero crossing detector 766. The zero crossing detector 766 ensures that the ASK modulator 760 only turns on when the 76 kHz signal crosses zero. This prevents spurious frequency components from being generated and interfering with other signals in the pass band of the transmitter. In the preferred embodiment, only the ASK modulator 760 is utilized.

The MCU 764 is operable to control the limiters 712 and also to control a sub-base enhancement limiter 770. The limiter 770 is disposed such that it receives on the input thereof the output of a crossover circuit 772, which has the input thereof connected to the output of a summing junction 774. The summing junction 774 is operable to sum the output of a left channel amplifier 776 and a right channel amplifier 778. The output of the limiter 770 is input to a summing junction 780, which sums the output of the limiter 770 with the output of a sub-base amplifier 782 for receiving a sub-base signal. The output of the summing junction 780 provides a sub-base enhancement signal. In general, the sub-base enhancement is due to the fact that the receiver low end frequency response is limited to approximately 300 Hz due to the volumetric considerations of the loudspeaker enclosure. By utilizing supplemental low frequency speakers, the overall system low frequency response can be extended. This is an output that goes to an external speaker via a connector 784.

The MCU 764 is operable to operate as either a master or a slave. In the master mode, the MCU 764 generates the sync signal and transmits it via an output 788 to the other systems. The volume controls are received on an input 790 and a mode control input is received on line 792. A basic serial connector 794 is provided for allowing interface external to the system.

In certain situations, it may be desirable to sum one of the channels, the PSE1 channel, with the other channels such that, for example, background material on a single channel can be summed with the other channels. This is facilitated by disposing summing junctions 800 and 802 in the left and right channel paths of each of the PSE2, PSE3 and PSE4 channels. The output of the left amplifier 694 for the left channel on PSE1 is selectively connected to summing junctions 800 via a switch 804 and the output of the amplifier 696 for the PSE1 channel is selectively connected to the second input of the summing junction 802 via a switch 806.

Figure 16:
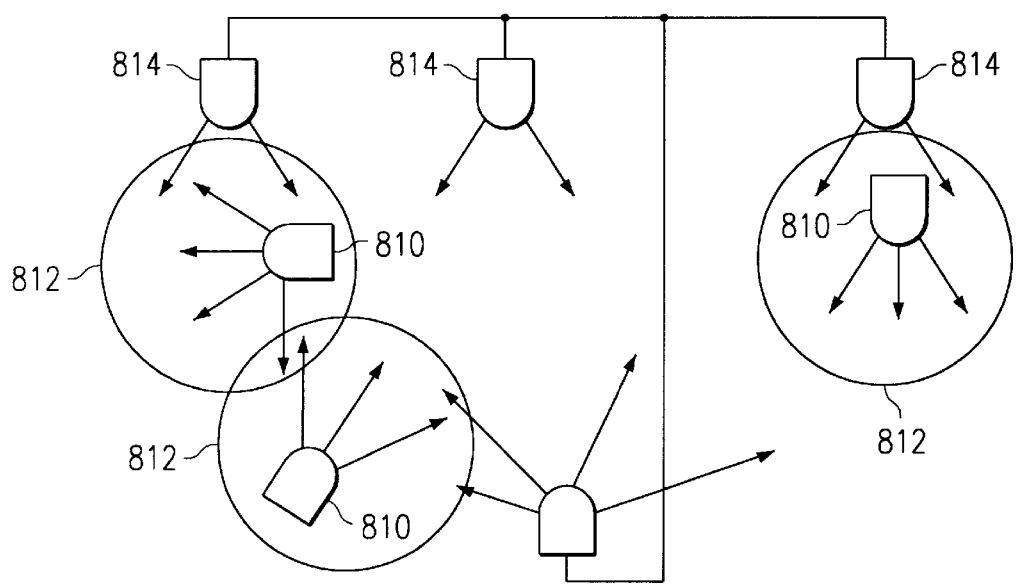
FIG. 16 illustrates a block diagram of an alternate configuration for the transmitters and zones.

Referring now to FIG. 16, there is illustrated an alternate embodiment for a configuration for the transmitters and zones. In the embodiment of FIG. 16, there are illustrated a plurality of transmitters 810, each having a Zone 812 associated therewith. Each of the Zones 812 are disposed adjacent to each other and slightly overlapping. As described above, the overlapping zones cannot have common channels, such that one zone may have channel 1 and 2 and an adjacent zone may have channel 3 and 4. This provides the user the ability to walk from zone to zone and receive different programming, as described hereinabove.

In the embodiment of FIG. 16, an additional set of flood transmitters 814 are provided, the flood transmitters 814 acting as one transmitter such that they all operate on the same sync frequency with the same command transmitted. Typically, they will be configured such that they cover the entire area, including all of the area within which the transmitters 810 are disposed and operate at the lowest sync frequency. For example, the sync frequency of the flood transmitters 814 will be 12 Hz, whereas the transmitters 810 will be alternately disposed at a sync frequency of 16 Hz and 24 Hz. Additionally, the flood transmitters will operate such that they are on the lowest channel with the lowest pulse width. If they were at a mute pulse width, this would be 1 ms. The reason for this is that when a user goes from the lowest sync rate to a higher sync rate, the additional pulse in the, for example, 24 Hz sync rate zone will register as a higher sync rate and the pulse width of the 24 Hz zone, being larger than the 12 Hz zone, will override the pulse width of the 12 Hz flood zone. Therefore, as soon as the extra pulse is detected, the wide pulse width will be detected for all pulses and the user's receiver will immediately and seamlessly detect that it is within one of the zones 812. In this manner, the user will always be subjected to some type of background music or to a mute signal when leaving any Zone 812 and entering the flood zone. Although the Zones 812 are shown as overlapping, they could be spread throughout an exhibit hall, with the remaining portion of the exhibit hall subjected to the 12 Hz sync rate and the command associated therewith.

In summary, there has been disclosed a method and apparatus for allowing communication in adjacent zones such that a user wearing (or carrying) a headset can traverse from zone to zone and communicate with that zone merely by entering the zone itself All zones are synchronized to a common sync rate with the discriminating aspect for the receivers for transferring from one zone to another being a change in sync rates. Commands are transmitted at the sync rate by pulse width modulating the pulses associated with the sync signal. By associating commands with incrementally different pulse widths and sync rates, these commands can be transmitted at the same time as the sync signal is transmitted. These commands, once received, indicate the channel that is being transmitted and the channel to which the receiver is to be tuned.

Although the present embodiment has been described in detail, it should be understood that various changes, substitutions and alterations can be made therein without departing from the spirit and scope of the invention as defined by the appended claims.

What is claimed is:

1. A method for controlling a plurality of mobile receivers, comprising:
    controlling a plurality of associated transmitters in synchronism with a synchronizing carrier;
    modulating the synchronizing carrier in each of the transmitters with a predefined pulse stream such that the pulse streams in all of the transmitters are synchronized, the pulse stream encoding at least a first parameter and a second parameter;
    radiating a signal from each of the transmitters into at least one of a predefined set of adjacent zones;
    demodulating the synchronizing carrier in each of the receivers; and
    operating each of the receivers in a state determined by the first parameter and in a condition determined by the second parameter.
2. The method of claim 1, wherein the step of controlling includes generating the synchronizing carrier.
3. The method of claim 2, wherein the step of generating includes producing an infrared signal.
4. The method of claim 1, wherein the step of modulating includes:
    varying the repetition rate of the pulse stream in accordance with the first parameter; and
    varying the pulse width of pulses in the pulse stream in accordance with the second parameter.
5. The method of claim 4, wherein the step of varying the repetition rate comprises:
    selecting a particular repetition rate for operating a first transmitter;
    selecting, for a second transmitter, a particular harmonic of the repetition rate for operating the second transmitter; and
    coupling the selected repetition rates to each of the respective transmitters.
6. The method of claim 4, wherein the step of varying the repetition rate comprises:
    selecting a particular repetition rate defining one of a set of operating states; and
    coupling the selected repetition rate to a modulator in the transmitter.
7. The method of claim 6, wherein an operating state includes a state selected from the group of idle, awake, self-test, audio only, shutters only, full operation and set maximum channel.
8. The method of claim 4, the first parameter defining an operating state.
9. The method of claim 4, wherein in the step of varying the pulse width comprises:
    selecting a particular pulse width defining one of a set of state conditions; and
    coupling the selected pulse width to a modulator in the transmitter.
10. The method of claim 9, wherein a state condition includes a condition selected from the group of first mute, first user channel, channel 1, channel 2, channel 3, channel 4, second user channel and second mute.
11. The method of claim 4, said second parameter defining a state condition.
12. The method of claim 1, wherein the step of radiating comprises directing substantially all of the energy radiated by each of the transmitters into one of the predefined zones.
13. The method of claim 12, wherein the step of directing includes causing energy radiated by transmitters radiating into adjacent zones to partially overlap in the vicinity of the common boundaries of the adjacent zones.
14. The method of claim 1, wherein the step of demodulating comprises:
    detecting the synchronizing carrier;
    separating synchronizing data from the carrier; and
    processing the data.
15. The method of claim 14, wherein the step of processing the data comprises:
    extracting information corresponding to the first and second parameters; and
    controlling said receiver in accordance with the first and second parameters.
16. The method of claim 15, wherein the step of controlling comprises:
    causing an output from the receiver corresponding to signals transmitted in the zone defined by the first parameter; and
    selecting a state condition for the receiver corresponding to channel data defined by the second parameter.
17. The method of claim 1, wherein the step of operating comprises:
    receiving signals corresponding to the output of a transmitter operating in the zone defined by the first parameter; and
    executing commands corresponding to an encoded state condition defined by the second parameter.
18. An apparatus for controlling a plurality of mobile receivers, comprising:

means for controlling a plurality of associated transmitters in synchronism with a synchronizing carrier;

means for modulating the synchronizing carrier in each of the transmitters with a predefined pulse stream such that the pulse streams in all of the transmitters are synchronized, the pulse stream encoding at least a first parameter and a second parameter;

means for radiating a signal from each of the transmitters into at least one of the predefined set of adjacent zones;

means for demodulating the synchronizing carrier in each of the receivers; and means for operating each of the receivers in a state determined by the first parameter and in a condition determined by the second parameter.

19. The apparatus of claim 18, wherein the means for controlling includes means for generating the synchronizing carrier.

20. The apparatus of claim 19, wherein the means for generating includes means for producing an infrared signal.

21. The apparatus of claim 18, wherein the means for modulating includes:

means for varying the repetition rate of the pulse stream in accordance with the first parameter; and means for varying the pulse width of pulses in the pulse stream in accordance with the second parameter.

22. The apparatus of claim 21, wherein the means for varying the repetition rate comprises:

means for selecting a particular repetition rate for operating a first transmitter;

means for selecting, for a second transmitter, a particular harmonic of the repetition rate for operating the second transmitter; and means for coupling the selected repetition rates to each of the respective transmitters.

23. The apparatus of claim 21, wherein the means for varying the repetition rate comprises:

means for selecting a particular repetition rate defining one of a set of operating states; and means for coupling the selected repetition rate to a modulator in the transmitter.

24. The apparatus of claim 23, wherein an operating state includes a state selected from the group of idle, awake, self-test, audio only, shutters only, full operation and set maximum channel.

25. The apparatus of claim 21, the first parameter defining an operating state.

26. The apparatus of claim 21, wherein the means for varying the pulse width comprises:

means for selecting a particular pulse width defining one of a set of state conditions; and means for coupling the selected pulse width to a modulator in the transmitter.

27. The apparatus of claim 26, wherein a state condition includes a condition selected from the group of first mute, first user channel, channel 1, channel 2, channel 3, channel 4, second user channel and second mute.

28. The apparatus of claim 21, the second parameter defining a state condition.

29. The apparatus of claim 18, wherein the means for radiating comprises means for directing substantially all of the energy radiated by each of the transmitters into one of the predefined zones.

30. The apparatus of claim 29, wherein the means for directing includes means for causing energy radiated by transmitters radiating into adjacent zones to partially overlap in the vicinity of the common boundaries of the adjacent zones.

31. The apparatus of claim 18, wherein the means for demodulating comprises:

means for detecting the synchronizing carrier;

means for separating synchronizing data from the carrier; and means for processing the data.

32. The apparatus of claim 14, wherein the means for processing the data comprises:

means for extracting information corresponding to the first and second parameters; and means for controlling said receiver in accordance with the first and second parameters.

33. The apparatus of claim 32, wherein the means for controlling comprises:

means for causing an output from the receiver corresponding to signals transmitted in the zone defined by the first parameter; and means for selecting a state condition for the receiver corresponding to channel data defined by the second parameter.

34. The apparatus of claim 18, wherein the means for operating comprises:

means for receiving signals corresponding to the output of the transmitter operating in the zone defined by the first parameter; and means for executing commands corresponding to an encoded state condition defined by the second parameter.

* * * * *